(12) United States Patent
Baer et al.

(10) Patent No.: US 11,673,175 B2
(45) Date of Patent: Jun. 13, 2023

(54) RING GEARS AND METHODS OF MAKING THEREOF

(71) Applicant: ACCELERATED SYSTEMS INC., Waterloo (CA)

(72) Inventors: Stanley Baer, Kitchener (CA); Willem Jager, Cambridge (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 0 days.

(21) Appl. No.: 16/940,494

(22) Filed: Jul. 28, 2020

(65) Prior Publication Data
US 2021/0031253 A1 Feb. 4, 2021

Related U.S. Application Data

(60) Provisional application No. 62/880,470, filed on Jul. 30, 2019.

(51) Int. Cl.
*B23F 19/00* (2006.01)
*B21C 23/14* (2006.01)
*F16H 55/06* (2006.01)
*F16H 55/17* (2006.01)
*B23P 23/04* (2006.01)
*B21K 1/30* (2006.01)

(52) U.S. Cl.
CPC .............. *B21C 23/14* (2013.01); *B23F 19/00* (2013.01); *B23P 23/04* (2013.01); *F16H 55/06* (2013.01); *F16H 55/17* (2013.01); *B21K 1/30* (2013.01); *F16H 2055/176* (2013.01)

(58) Field of Classification Search
CPC . B21K 1/30; B21K 1/305; B23P 15/14; B23F 19/00; B23F 19/007
See application file for complete search history.

(56) References Cited

U.S. PATENT DOCUMENTS

| | | | |
|---|---|---|---|
| 1,853,354 A * | 4/1932 | Henry | ................... B23F 19/007 409/32 |
| 4,256,348 A | 3/1981 | Lester et al. | |

(Continued)

FOREIGN PATENT DOCUMENTS

| | | |
|---|---|---|
| CN | 102011852 A | 4/2011 |
| WO | 2018055484 A1 | 3/2018 |
| WO | WO-2018139896 A1 * | 8/2018 ............. F16H 19/04 |

*Primary Examiner* — Christopher J Besler
(74) *Attorney, Agent, or Firm* — Nyssa Inc.

(57) ABSTRACT

There is provided a method of forming a ring gear, including providing a tube having an inner surface comprising gear teeth, the tube being a hollow tube formed by extrusion. The method also includes inserting a shaping tool into the tube, the shaping tool having tool teeth to mate with the gear teeth, and extended and retracted configurations. The shaping tool may be inserted into the tube in its retracted configuration. Moreover, the method includes extending the shaping tool into its extended configuration to cause the tool teeth to mate with the gear teeth and to exert a radially outward force on the tube. Furthermore, the method includes fixing a shape of an outer perimeter of the tube, retracting the shaping tool into its retracted configuration to reduce the radially outward force exerted by the shaping tool on the tube, and removing the shaping tool from the tube.

13 Claims, 26 Drawing Sheets

(56) References Cited

U.S. PATENT DOCUMENTS

| | | | |
|---|---|---|---|
| 5,392,517 A * | 2/1995 | Lyon | B23P 13/04 29/893.36 |
| 2007/0197340 A1 | 8/2007 | Kim et al. | |
| 2014/0020442 A1* | 1/2014 | Menendez-Castanedo | B22F 5/08 72/362 |
| 2019/0176418 A1 | 6/2019 | Richter et al. | |
| 2019/0348752 A1* | 11/2019 | Kim | H01Q 1/1264 |

* cited by examiner

```
                                          100
                                            ↘
┌─────────────────────────────────────────────────────────────────────┐
│  Providing a tube having an inner surface comprising gear teeth,    │
│  the tube being a hollow tube formed by extrusion                   │
│                                                                     │
│                              105                                    │
└─────────────────────────────────────────────────────────────────────┘
                                  │
                                  ▼
┌─────────────────────────────────────────────────────────────────────┐
│  Inserting a shaping tool into the tube, the shaping tool having    │
│  tool teeth to mate with the gear teeth, the shaping tool having    │
│  an extended configuration and a retracted configuration, the       │
│  shaping tool inserted into the tube in its retracted configuration │
│                                                                     │
│                              110                                    │
└─────────────────────────────────────────────────────────────────────┘
                                  │
                                  ▼
┌─────────────────────────────────────────────────────────────────────┐
│  Extending the shaping tool into its extended configuration to      │
│  cause the tool teeth to mate with the gear teeth and to exert a    │
│  radially outward force on the tube                                 │
│                                                                     │
│                              115                                    │
└─────────────────────────────────────────────────────────────────────┘
                                  │
                                  ▼
┌─────────────────────────────────────────────────────────────────────┐
│            Fixing a shape of an outer perimeter of the tube         │
│                                                                     │
│                              120                                    │
└─────────────────────────────────────────────────────────────────────┘
                                  │
                                  ▼
┌─────────────────────────────────────────────────────────────────────┐
│  Retracting the shaping tool into its retracted configuration to    │
│  reduce the radially outward force exerted by the shaping tool on   │
│  the tube                                                           │
│                                                                     │
│                              125                                    │
└─────────────────────────────────────────────────────────────────────┘
                                  │
                                  ▼
┌─────────────────────────────────────────────────────────────────────┐
│                 Removing the shaping tool from the tube             │
│                                                                     │
│                              130                                    │
└─────────────────────────────────────────────────────────────────────┘
```

Fig. 1

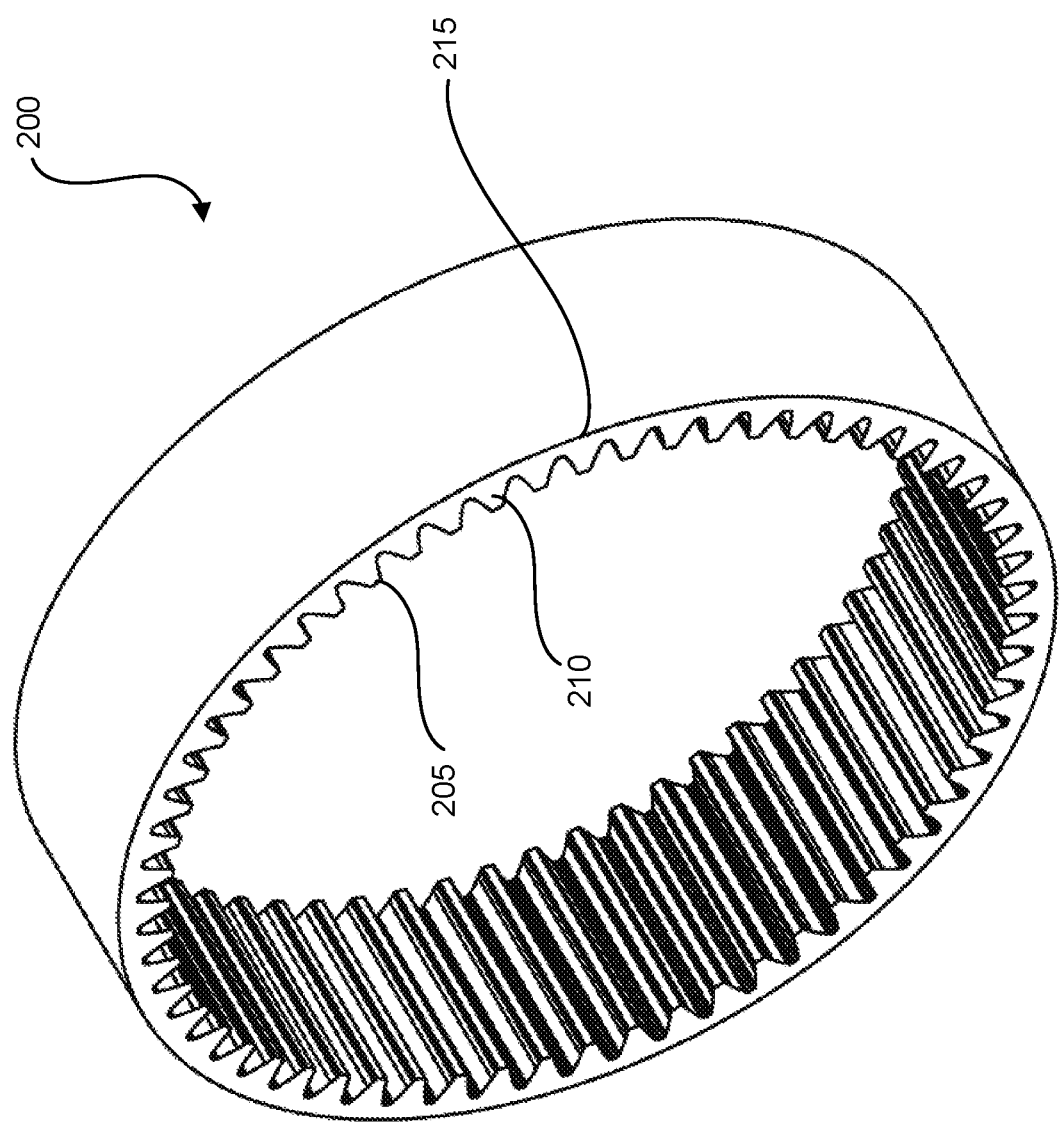

RING GEARS AND METHODS OF MAKING THEREOF

CROSS-REFERENCE TO RELATED APPLICATION

This application claims the benefit of and priority from U.S. Provisional Patent Application No. 62/880,470, filed on Jul. 30, 2019, which is incorporated herein by reference in its entirety.

FIELD

This specification relates to ring gears and methods of making thereof, and in particular to ring gears and methods of making thereof using metal extrusion.

BACKGROUND

Gears have many uses such as those in mechanical and industrial applications. Many different types of gears are used in machines and industrial equipment. One type of gear is the ring gear.

SUMMARY

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a method of forming a ring gear, the method comprising: providing a tube having an inner surface comprising gear teeth, the tube being a hollow tube formed by extrusion; inserting a shaping tool into the tube, the shaping tool having tool teeth to mate with the gear teeth, the shaping tool having an extended configuration and a retracted configuration, the shaping tool inserted into the tube in its retracted configuration; extending the shaping tool into its extended configuration to cause the tool teeth to mate with the gear teeth and to exert a radially outward force on the tube; fixing a shape of an outer perimeter of the tube; retracting the shaping tool into its retracted configuration to reduce the radially outward force exerted by the shaping tool on the tube; and removing the shaping tool from the tube.

The providing the tube may comprise extruding the tube.

The providing the tube may comprise providing a hollow metallic tube.

The providing the tube may comprise providing an aluminum tube.

The method may further comprise anodizing the gear teeth.

The method may further comprise sectioning the tube to form one or more rings.

The shaping tool may comprise a mandrel having: a plurality of toothed sections arranged radially around a core portion, each of the toothed sections comprising a subset of the tool teeth, each of the toothed sections movably abutting the core portion along an inclined surface inclined relative to an axial axis of the mandrel, wherein: moving the core portion in a first direction along the axial axis relative to the toothed sections moves the toothed sections radially away from the core portion to extend the shaping tool into its extended configuration; and moving the core portion in a second direction along the axial axis relative to the toothed sections moves the toothed sections radially towards the core portion to retract the shaping tool into its retracted configuration, the second direction opposite the first direction; and the extending the shaping tool may comprise moving the core portion in the first direction relative to the toothed sections.

The retracting the shaping tool may comprise moving the core portion in the second direction relative to the toothed sections.

The fixing the shape may comprise machining the outer perimeter to adjust the shape of the outer perimeter relative to the gear teeth.

The fixing the shape may comprise positioning a supporting member to abut the outer perimeter along at least a portion of the outer perimeter.

The fixing the shape may comprise inserting the tube into a sleeve.

The method may further comprise refining a shape of the gear teeth.

The refining the shape of the gear teeth may comprise the extending the shaping tool into its extended configuration.

Another aspect of the present specification provides a ring gear device comprising: a tube having an inner surface comprising gear teeth, the tube being a hollow aluminum tube formed by extrusion.

At least a portion of outer surfaces of the gear teeth may be anodized.

The ring gear device may further comprise a supporting member positioned to abut an outer perimeter of the tube along at least a portion of the outer perimeter.

The supporting member may comprise a sleeve, the tube being received in the sleeve.

The ring gear device may further comprise a plurality of planet gears matingly received inside the tube, the tube and the planet gears to cooperate to form a planetary gear system.

The planet gears may comprise one or more of a polymer and a plastic.

The plurality of planet gears may comprise six planet gears.

The ring gear device may further comprise a housing to receive at least a portion of the tube and the planet gears.

BRIEF DESCRIPTION OF THE DRAWINGS

Examples of the present invention will now be described with reference to the attached Figures, wherein:

FIG. 1 shows a flowchart of an example method for manufacturing a ring gear.

FIG. 2 shows a perspective view of an example hollow tube having an inner surface comprising gear teeth.

DETAILED DESCRIPTION

Figure 3:
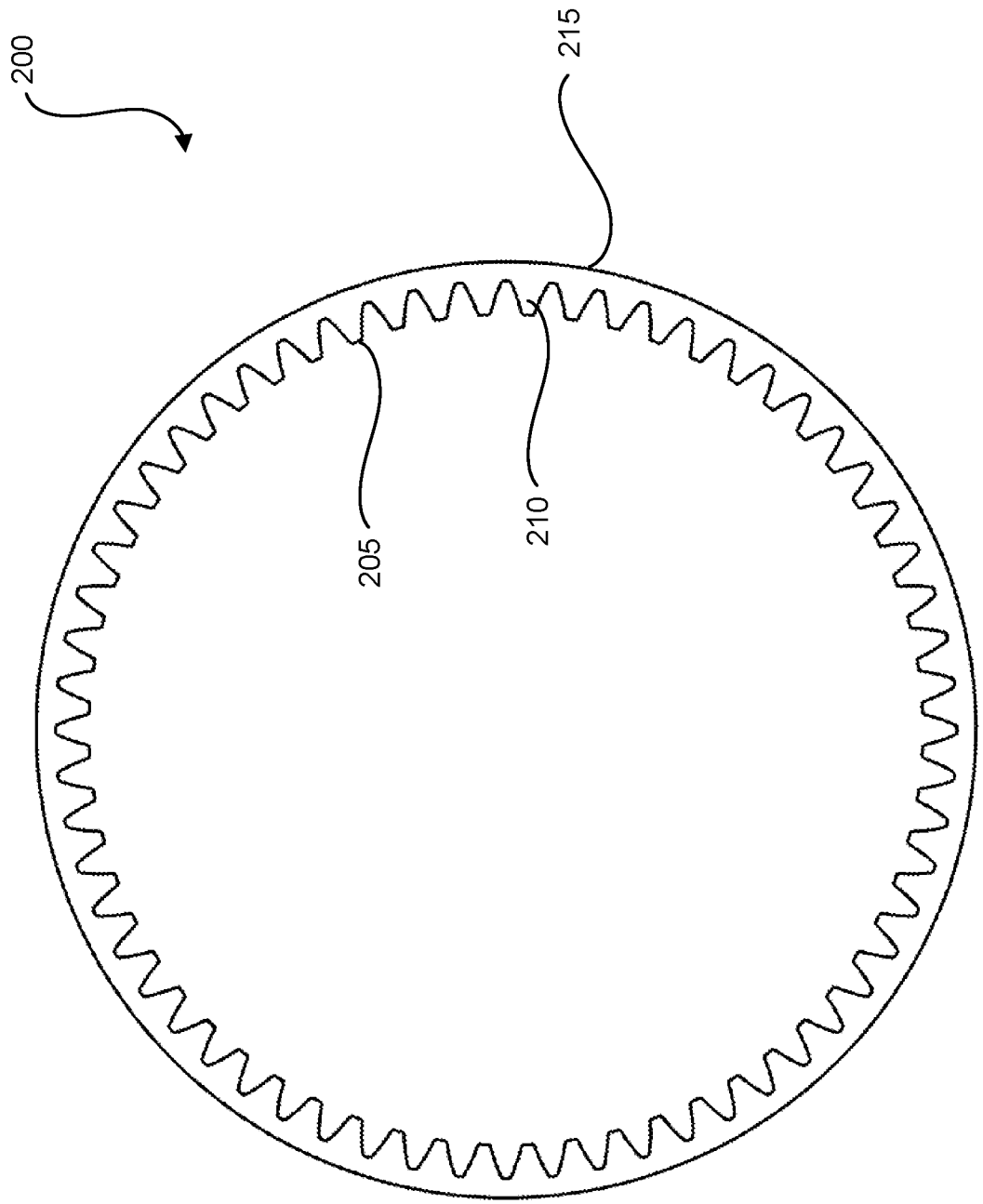
FIG. 3 shows a side elevation view of the tube of FIG. 2.

Ring gears may be formed by cutting or machining the gear, or using powder metallurgy by fusing together a metal-containing powder to form the shape of the gear. Cutting or machining may be an expensive and time-consuming process. Powder metallurgy may produce gears that are low in quality in terms of mechanical strength and geometrical precision. Ring gears may be manufactured at relatively lower cost and higher quality using a metal extrusion-based process. FIG. 1 shows a flowchart of an example method 100 of manufacturing a ring gear starting with a hollow metallic tube formed by extrusion.

At box 105 of method 100, a tube may be provided, which may have an inner surface comprising gear teeth. The tube may be formed by extrusion. In some examples, the tube may be a hollow metallic tube. Furthermore, in some examples, providing the hollow metallic tube may comprise extruding the hollow metallic tube. Moreover, in some examples the metal used to form the tube may comprise aluminum. In other words, the tube may comprise a hollow aluminum tube. Such an aluminum tube may comprise an aluminum-based alloy or an aluminum-containing alloy. In some examples, aluminum may be the primary or dominant component in the alloy, such as being the largest component by weight, by volume, and the like. In addition, in some examples, the aluminum tube may comprise pure or substantially pure aluminum. It is also contemplated that in some examples, the tube may be made of a metal other than aluminum, or of an alloy other than an aluminum-containing alloy.

In addition, it is contemplated that in some examples the tube may comprise, or be made of, non-metallic materials such as ceramics, fiber-reinforced polymers, and the like. Furthermore, in some examples this tube may be sectioned into rings or bands before further processing.

Moreover, at box 110 a shaping tool may be inserted into the tube. The shaping tool may have tool teeth to mate with the gear teeth. The shaping tool may be built in such a way that the accuracy of the position of one gear tooth flank in relation to all the other the gear tooth flanks may be adjusted or maintained using the shaping tool. Moreover, the shaping tool may have an extended configuration and a retracted configuration. The shaping tool may be inserted into the tube in its retracted configuration. In some examples, the shaping tool may comprise a mandrel, as shown and described in relation to FIGS. 8-17. It is contemplated that other shaping tools may also be used.

Furthermore, at box 115 the shaping tool may be extended into its extended configuration to cause the tool teeth to mate with the gear teeth and to exert a radially outward force on the tube. At box 120, in turn, the shape of the outer perimeter of the tube may be fixed. In some examples, this fixing may comprise correcting the shape. For example, with the shaping tool inserted and extended into its extended configuration, the tube may be put on a lathe to machine the outer perimeter of the tube to correct the outer perimeter to become, or nearly become, a circle concentric with the teeth. In some examples, the face of the ring gear may also be trued to provide perpendicularity or near-perpendicularity of the ring gear to the housing, sleeve, or other support member it will be received or pressed into.

Moreover, in some examples fixing the shape of the outer perimeter may comprise preserving the shape to prevent it from spontaneous deformation. For example, the hollow tube may have a tendency to spontaneously collapse from a circular shape into an oval or deformed-circular shape. The circular shape that the tube may be forced into by the shaping tool may be preserved by inserting the tube into a supporting member such as a sleeve. In some examples the sleeve may comprise a compression sleeve. Such a sleeve may exert a radially inward compressive force on the tube to preserve the circular shape of the tube and prevent the tube from spontaneous collapse or deformation into a non-circular shape. Furthermore, in some examples the sleeve need not exert an active compressive force on the tube. Rather, the sleeve may simply fit snugly around the outer perimeter of the tube and resist a tendency of the tube to spontaneously deform into a non-circular shape. Shape preserving sleeves are described further in relation to FIGS. 18-20.

In addition, at box 125 the shaping tool may be retracted into its retracted configuration to reduce the radially outward force exerted by the shaping tool on the tube. In some examples, retracting the shaping tool may substantially reduce to zero or discontinue the shaping tool exerting the radially outward force on the tube. It is also contemplated that in some examples, retracting the shaping tool may reduce but not completely discontinue the outward force on the tube. Such a reduction of force may be sufficient to allow the shaping tool to be removed without damaging the tube and its gear teeth. Then, at box 130 the shaping tool may be removed from the tube.

In some examples, the outward force exerted by the shaping tool on the tube may also be used to refine or correct the shape of the gear teeth of the tube. Furthermore, in some examples a further shaping tool may be used to shape the gear teeth. For example, a one-hit broach may be slid, inserted, pulled, or otherwise moved axially along the tube to shave off anomalies or malformations from the gear teeth.

In addition, in some examples the tube (i.e. the ring gear) may be further processed to improve its performance as a ring gear. For example, in cases where the tube is extruded aluminum, hard anodization may be used to create a hard and relatively inert surface layer on the gear teeth. In some such examples, the anodization may be applied to at least a portion of the outer surface of the gear teeth. This surface layer may in turn reduce the wear on the gear teeth and increase the lifespan of the ring gear. Furthermore, the methods and ring gears described herein may provide ring gears with improved gear runout.

It is contemplated that in some examples some steps may be omitted from method 100, additional steps may be added, and/or steps may be performed in a different order than that shown in FIG. 1. A ring gear manufactured using method 100 may have a variety of uses, such as use as part of a planetary gear system, and the like.

Turning now to FIG. 2, a perspective view is shown of an example hollow metallic tube 200 having an inner surface 205 comprising gear teeth 210. Hollow metallic tube 200 may also be referred to as "tube 200", in short. While FIG. 2 shows tube 200 as being shaped as a band or a ring sectioned from a long tube, it is contemplated that in some examples tube 200 may comprise a tube elongated in its axial direction. Moreover, tube 200 shaped as a band or as a ring sectioned from a long tube may also be referred to as "ring gear 200". The gear devices described in relation to FIGS. 2-26 which incorporate ring gear 200 may be described as ring gear devices. Tube 200 may also have an outer perimeter 215. In some examples, perimeter 215 may be circular, which perimeter may be prone to spontaneously collapsing or deforming into a non-circular shape.

Figure 4:
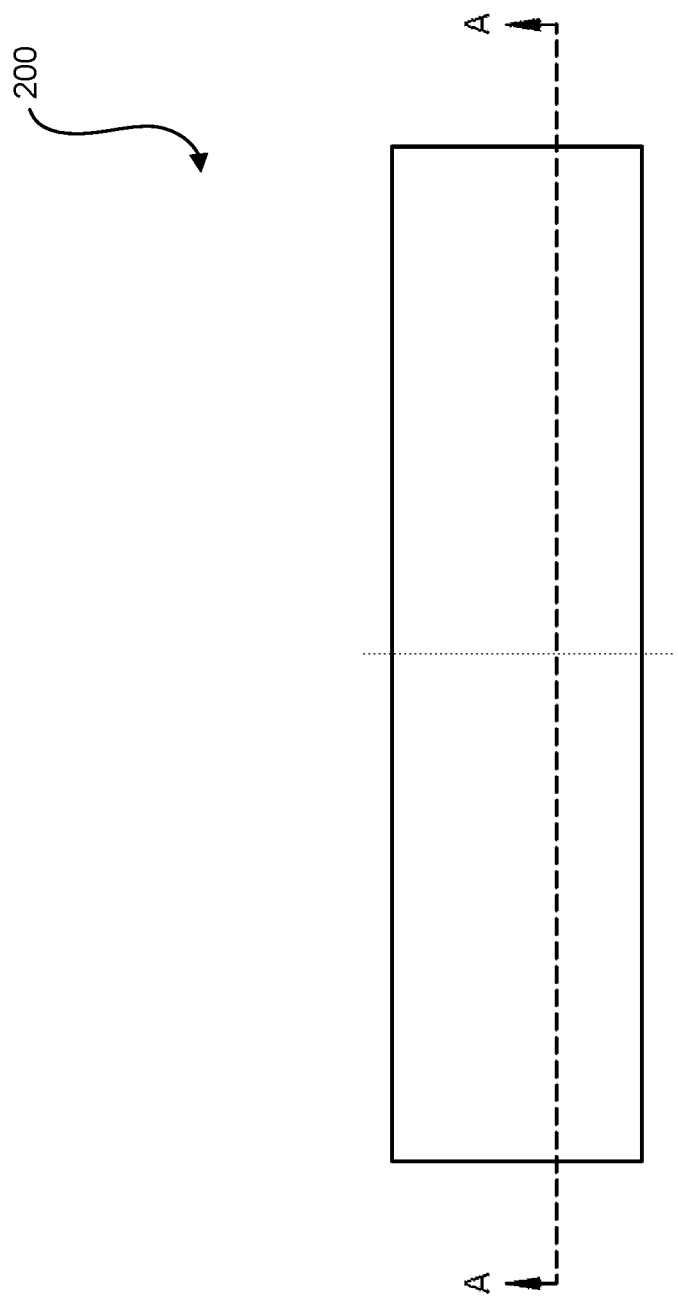
FIG. 4 shows a top plan view of tube of FIG. 2.
Figure 5:
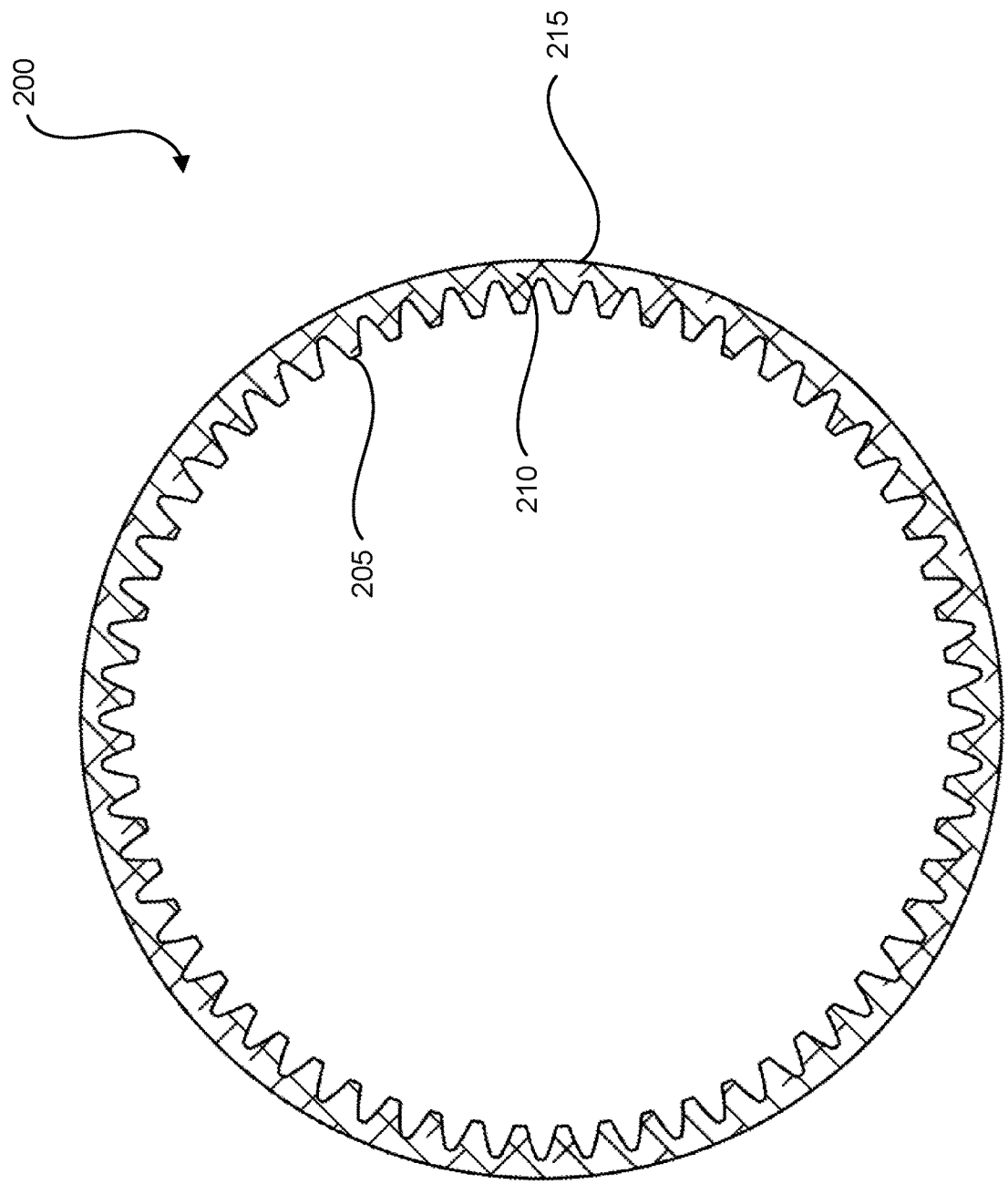
FIG. 5 shows a cross-sectional view of the tube of FIG. 2, with the cross-section taken along line AA shown in FIG. 4.

FIG. 3 shows a side elevation view of tube 200. FIG. 4, in turn, shows a top plan view of tube 200. Moreover, FIG. 5 shows a cross-sectional view of tube 200, with the cross-section taken along line AA shown in FIG. 4.

Figure 6:
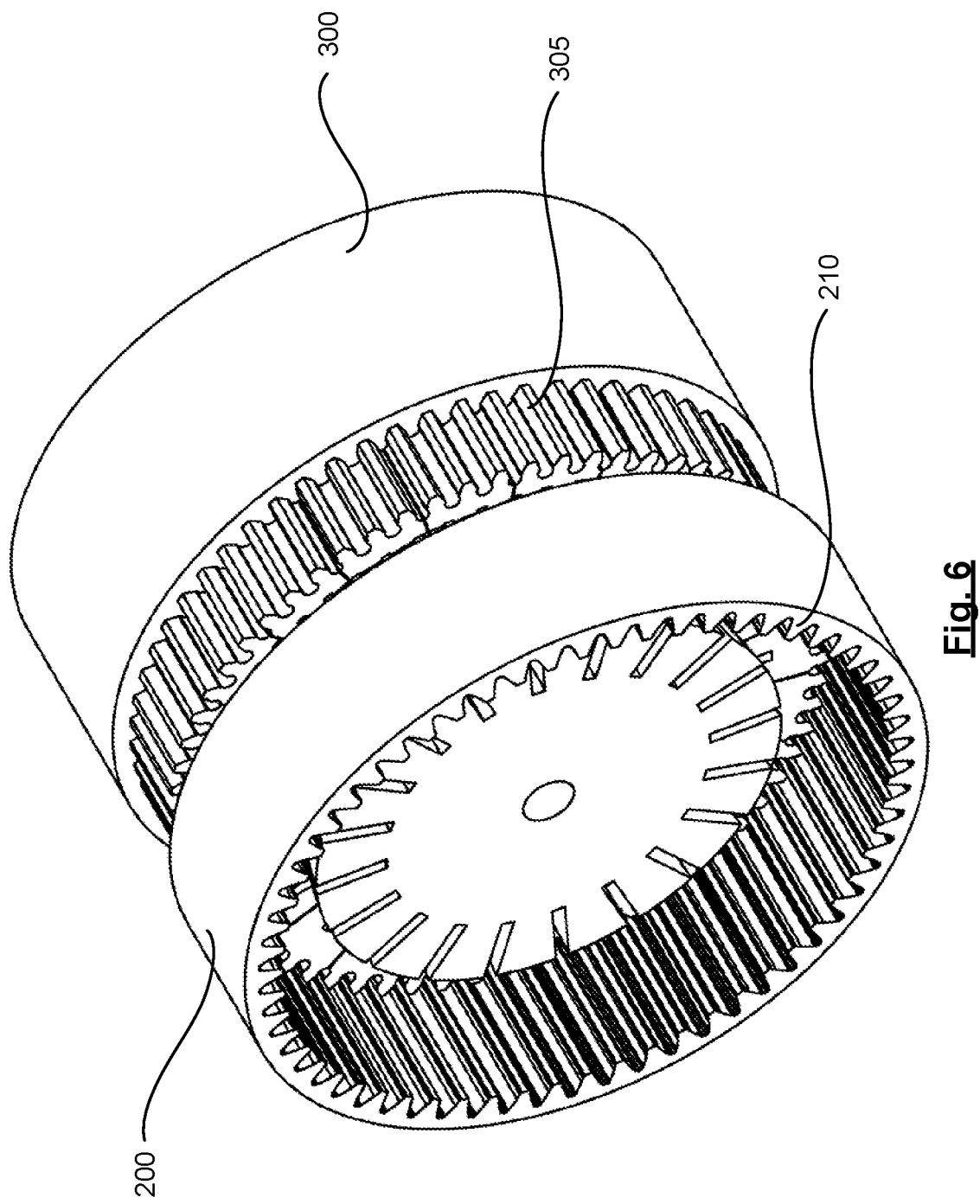
FIG. 6 shows a perspective view of an example mandrel in its retracted configuration and partially inserted into the tube of FIG. 2.
Figure 7:
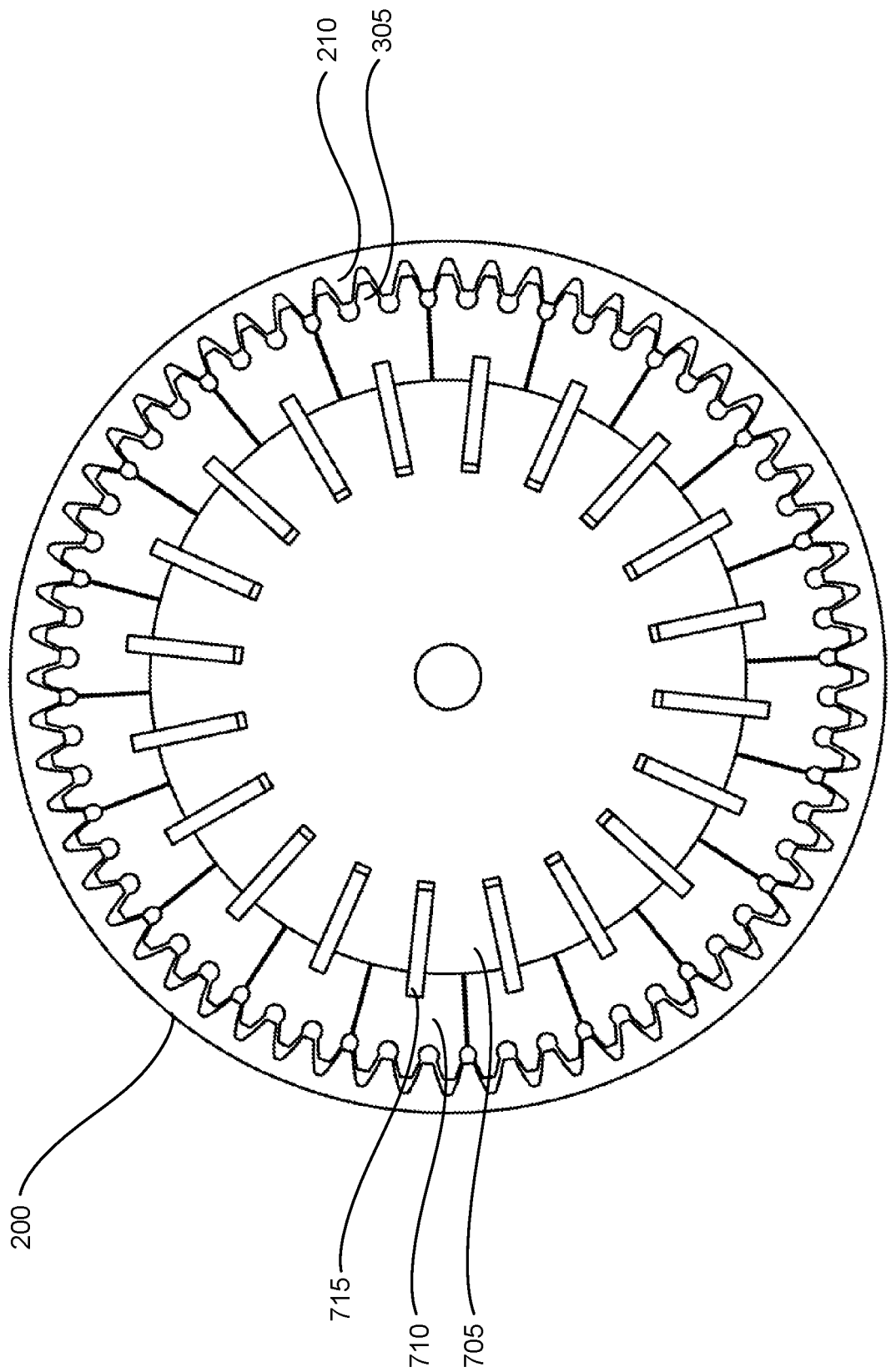
FIG. 7 shows a side elevation view of the mandrel of FIG. 6 inserted into the tube of FIG. 2.

Turning now to FIG. 6, a perspective view is shown of an example mandrel 300 in its retracted configuration and partially inserted into tube 200. In some examples, mandrel 300 may act as the shaping tool. Moreover, mandrel 300 may comprise tool teeth 305 to mate with gear teeth 210. Furthermore, FIG. 7 shows a side elevation view of mandrel 300 inserted into tube 200. Mandrel 300 comprises a core portion 705, which may comprise a draw bar. Mandrel 300 also comprises a plurality of toothed sections 710 arranged radially around the outer perimeter of core portion 705. Each toothed section 710 may be movably coupled to core portion 705 using a key 715. Key 715 may also be used to maintain the alignment of toothed sections 710 relative to core portion 705. Toothed sections 710 may move relative to core portion 705 as mandrel 300 transitions between its retracted and extended configurations.

Figure 8:
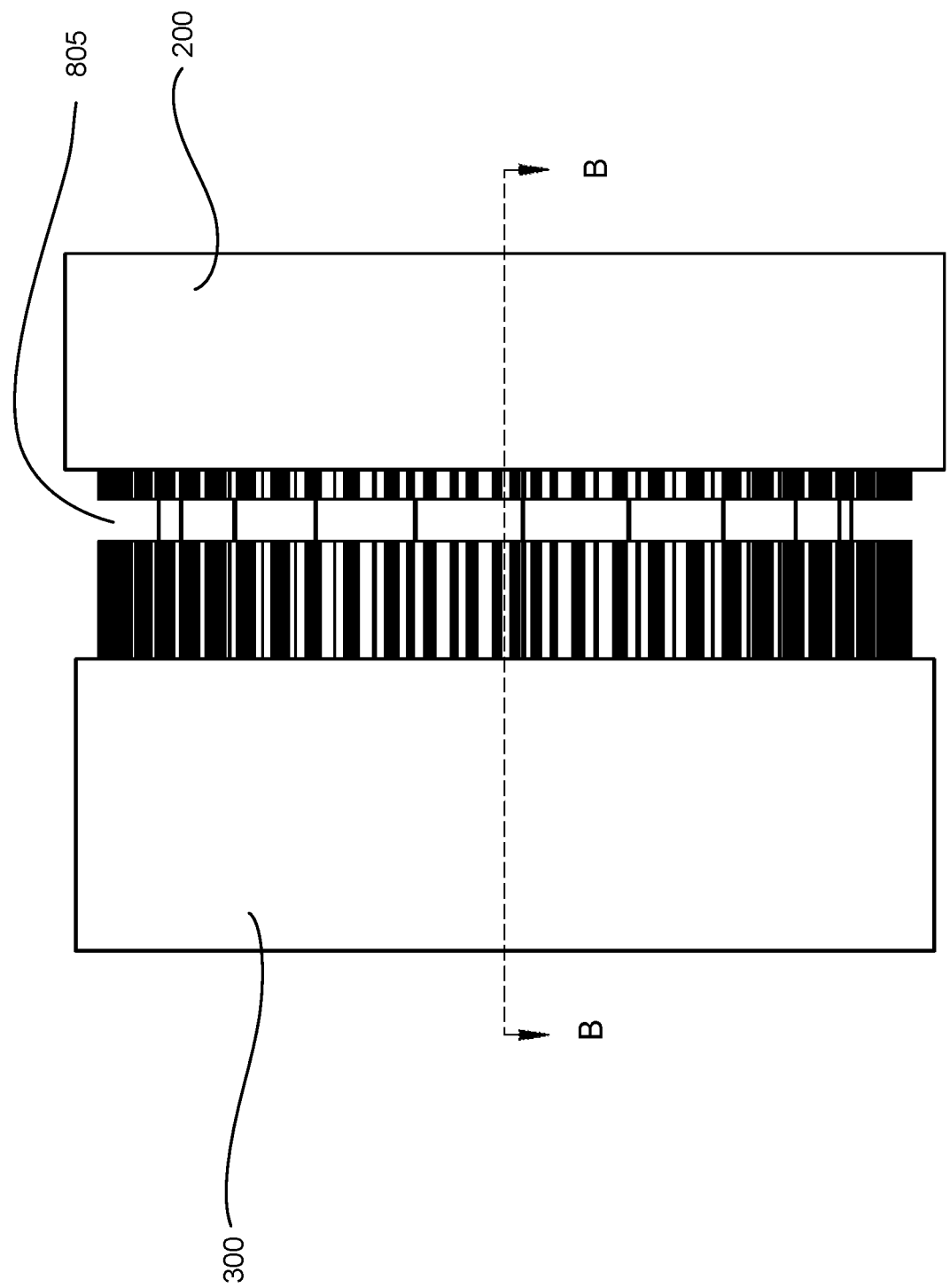
FIG. 8 shows a side elevation view of the mandrel of FIG. 6 partially inserted into the tube of FIG. 2.

FIG. 8, in turn, shows a side elevation view of mandrel 300 partially inserted into tube 200. FIG. 8 shows that mandrel 300 comprises a circumferential groove 805. In some examples, a circumferential tensioner (not shown) may be received in groove 805. This tensioner may pull the toothed sections radially inward towards core portion 705 upon discontinuation or reduction of the extending force forcing the toothed sections radially away from core portion 705. In some examples, the tensioner may comprise a coil spring, an elastomer, and the like.

Figure 9:
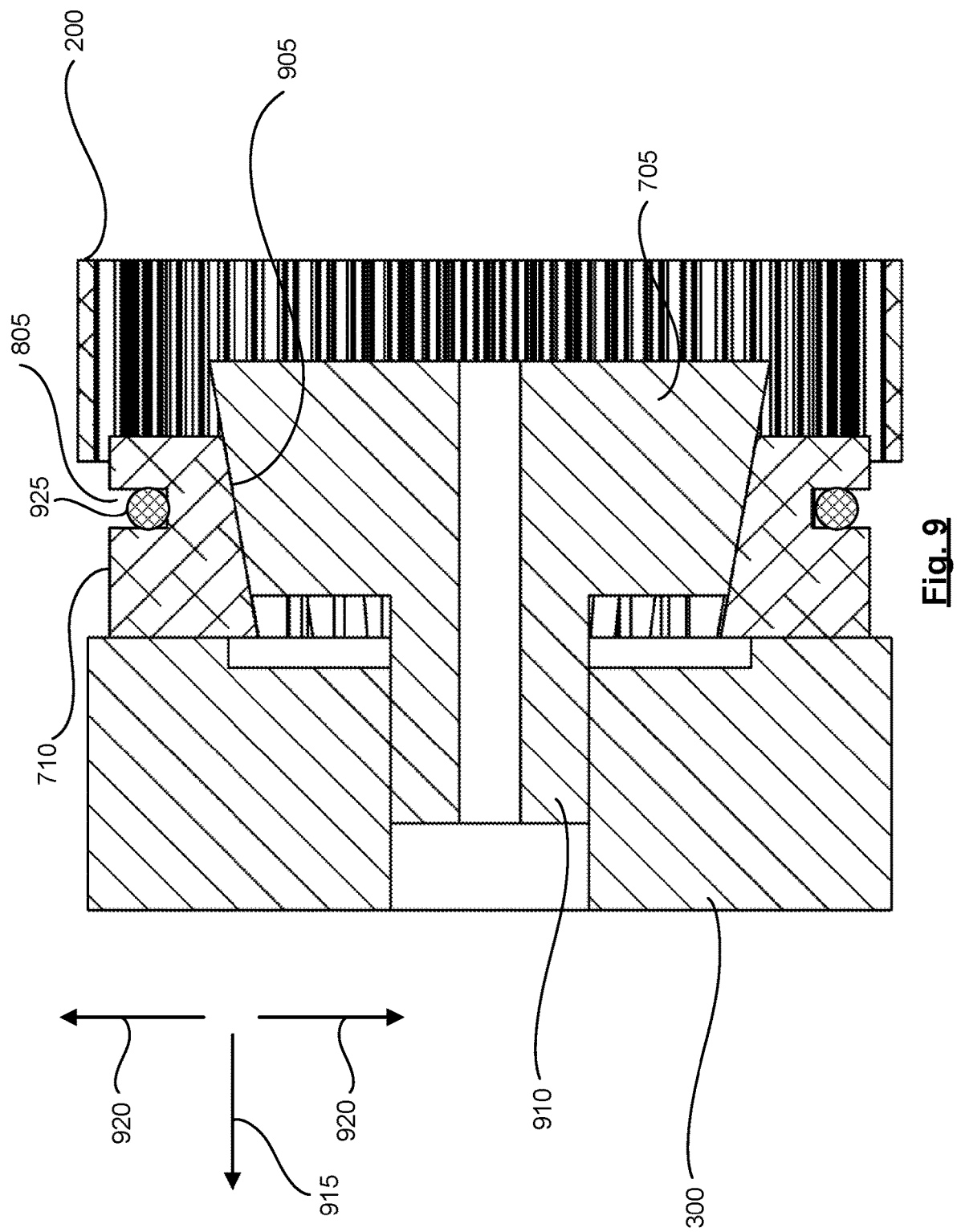
FIG. 9 shows a cross-sectional view of the mandrel of FIG. 6 partially inserted into the tube of FIG. 2, with the cross-section taken along line BB marked in FIG. 8.

FIG. 9 shows a cross-sectional view of mandrel 300 partially inserted into tube 200, with the cross-section taken along line BB marked in FIG. 8. FIG. 9 shows that in mandrel 300 the interface of toothed section 710 and core portion 705 is along an inclined plane 905. Inclined plane 905 may be inclined relative to the axial direction of mandrel 300 and tube 200. The axial direction may also be described as the axial axis of mandrel 300. In some examples this inclined plane may be created by designing core portion 705 to have a frustoconical shape, or another shape with slanted to sloped sides. While FIG. 9 shows a two-dimensional depiction of inclined plane 905 in a cross-sectional view, it is contemplated that in three dimensions inclined plane 905 may be a curved inclined surface such as the outer surface of a frustoconical shape, and the like. Core portion 705 may comprise or may terminate in a drawbar 910. When drawbar 910 is pulled in a direction 915, inclined plane 905 translates that pulling force into a radially outward force pushing in directions 920. In this manner, pulling drawbar 910 in direction 915 may cause mandrel 300 to transition into its extended configuration.

If the pulling force on drawbar 910 is relaxed, or if drawbar 910 is pushed in the direction opposite to direction 915, then the pulling force of tensioner 925 received in groove 805 may pull toothed sections 710 towards each other and radially inwardly towards core portion 705. This in turn may cause mandrel 300 to transition into its retracted configuration.

Figure 10:
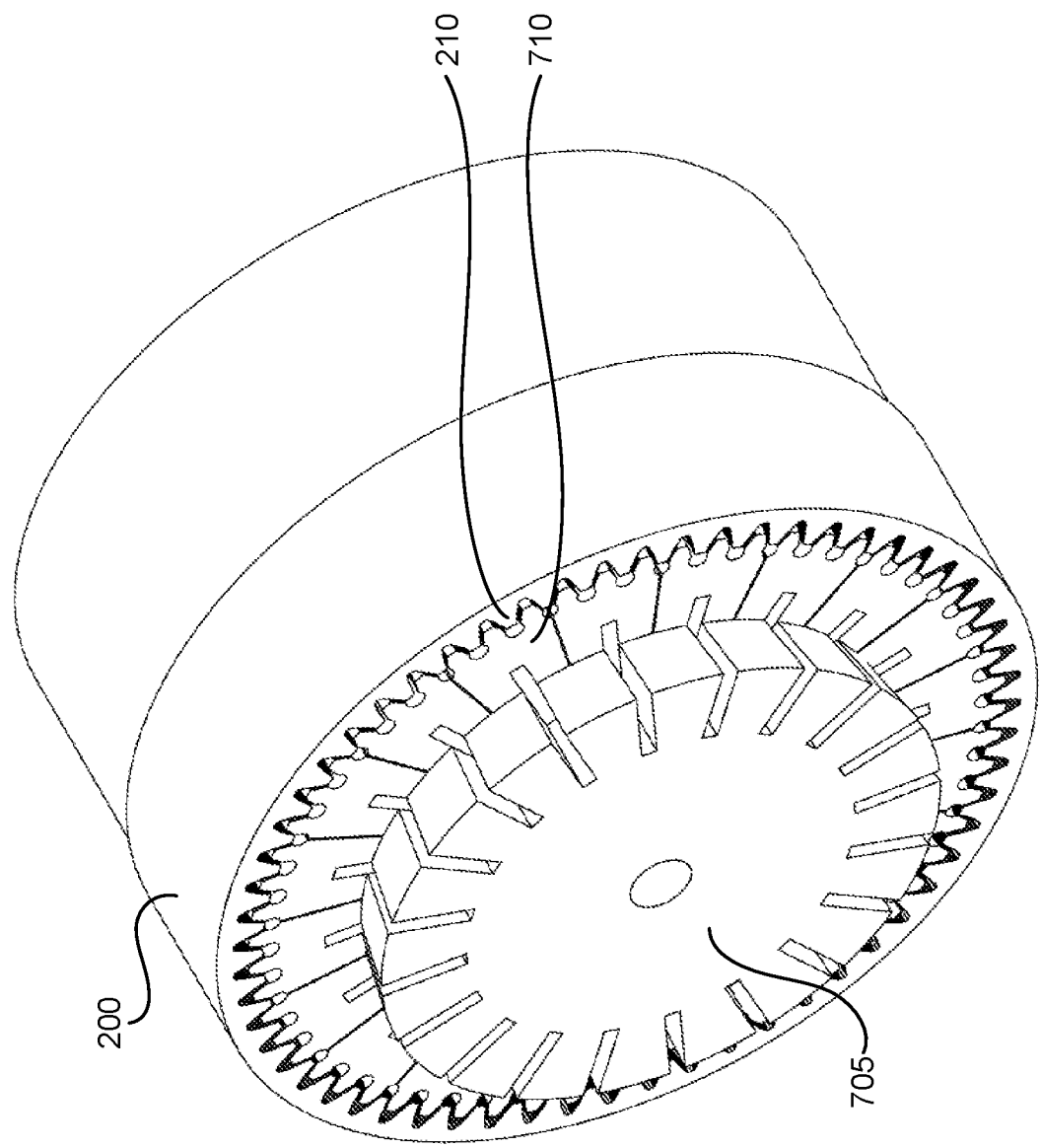
FIG. 10 shows a perspective view of the mandrel of FIG. 6 inserted into the tube of FIG. 2.

Turning now to FIG. 10, a perspective view is shown, which view shows toothed sections 710 and core portion 705 of the mandrel inserted into tube 200. FIG. 10 shows the mandrel in its retracted configuration with core portion 705 extending out in the axial direction relative to toothed sections 710. As the mandrel is in its retracted configuration, the teeth of toothed sections 710 are not abutting gear teeth 210 of tube 200. Using the drawbar to pull core portion 705 inward along the axial direction may be used to force the mandrel into its extended configuration thereby pushing the teeth of toothed sections 710 against gear teeth 210 of tube 200.

Figure 11:
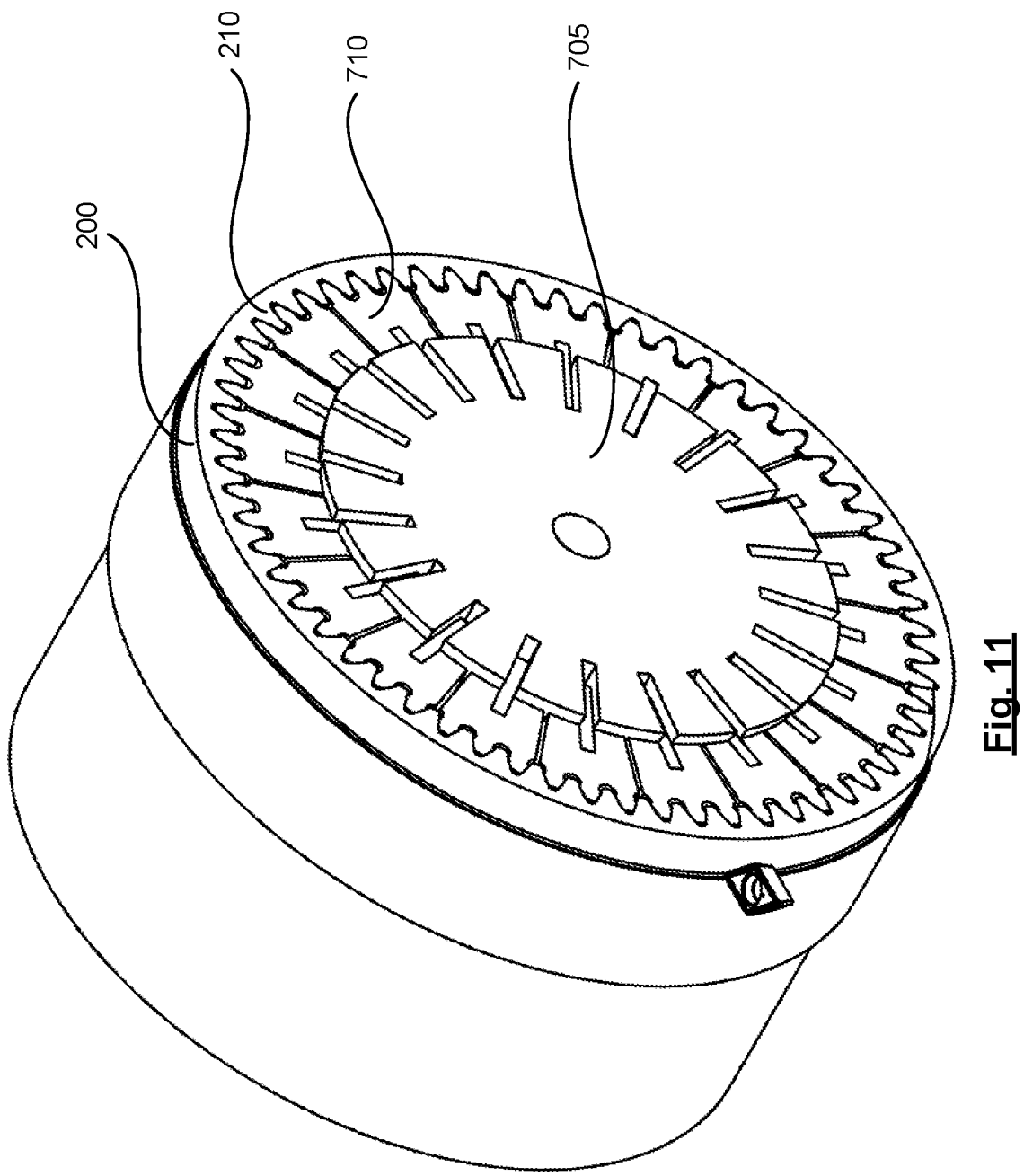
FIG. 11 shows a perspective view of the mandrel of FIG. 6 inserted into the tube of FIG. 2, with the mandrel in its extended configuration.
Figure 12:
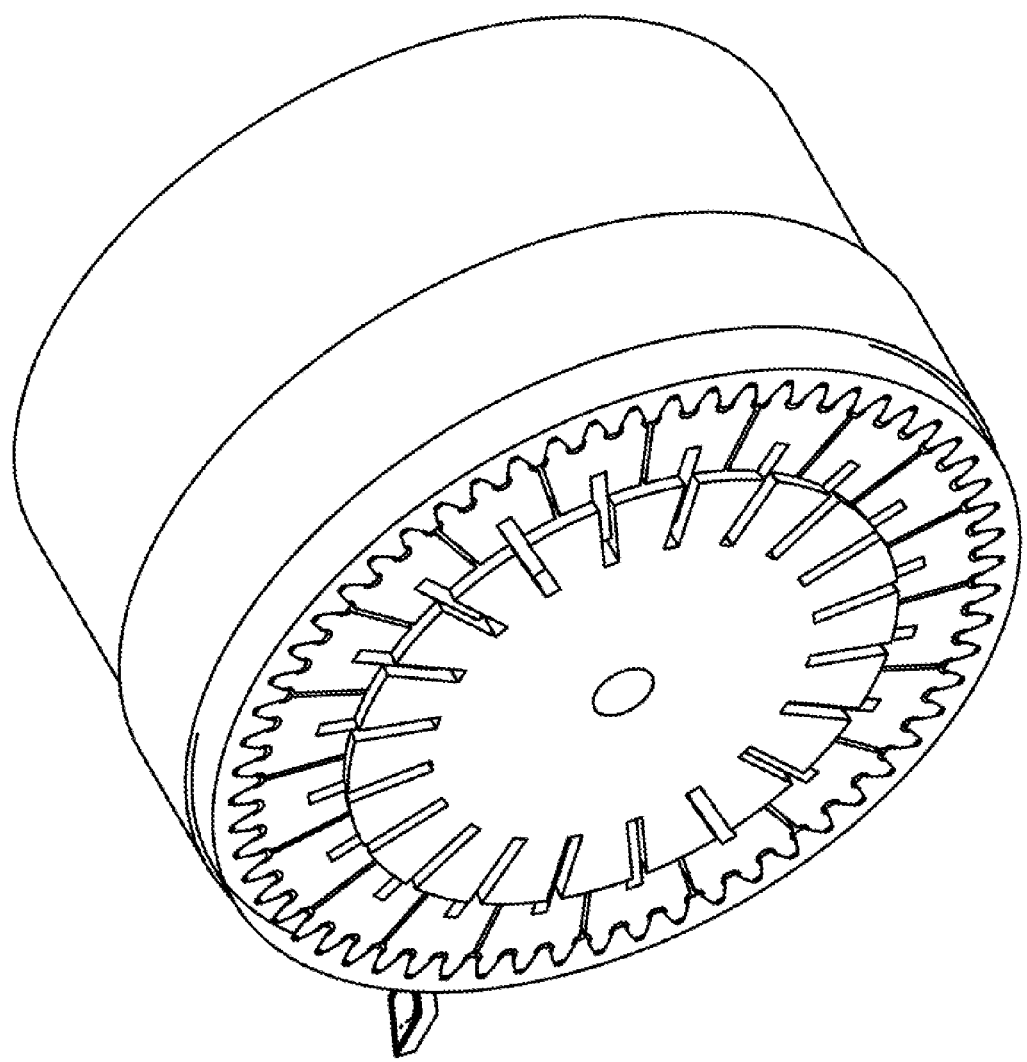
FIG. 12 shows another perspective view of the mandrel and tube shown in FIG. 11.
Figure 13:
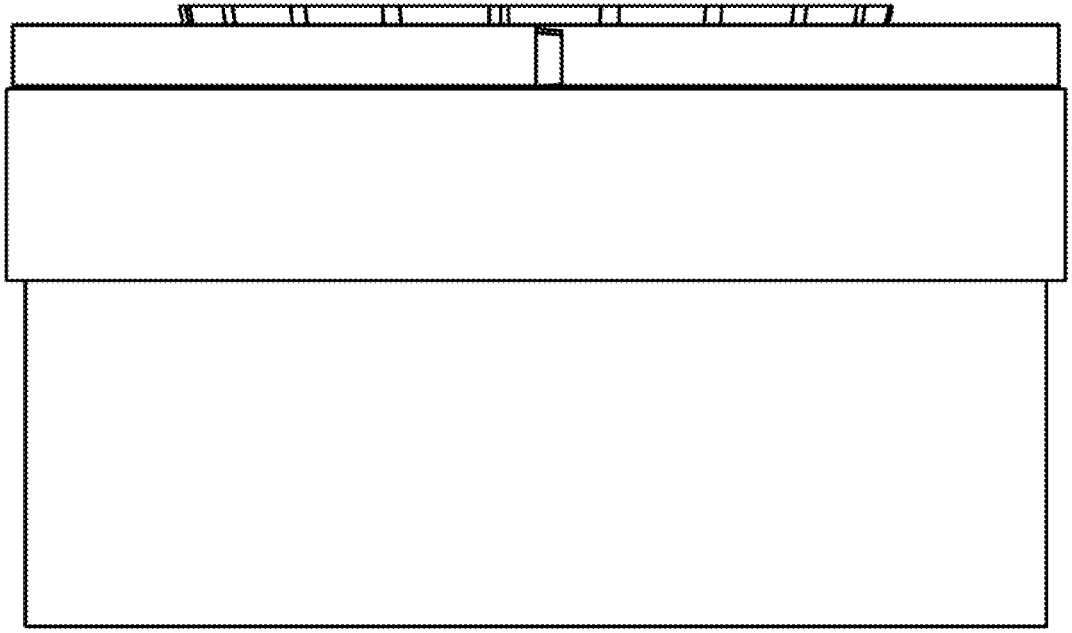
FIG. 13 shows a side elevation view of the mandrel and tube shown in FIG. 11.

FIG. 11 shows a perspective view of the mandrel inserted into tube 200 and in its extended configuration. As FIG. 11 shows, core portion 705 has been pulled axially inwards, which in turn pushes toothed sections 710 radially outwards against gear teeth 210 of tube 200. FIG. 12 shows another perspective view of the mandrel and tube 200 shown in FIG. 11. FIG. 13, in turn, shows a side elevation view of the mandrel and tube 200 shown in FIG. 11. In addition, FIG. 14 shows a front elevation view of the mandrel and tube 200 shown in FIG. 11.

Figure 14:
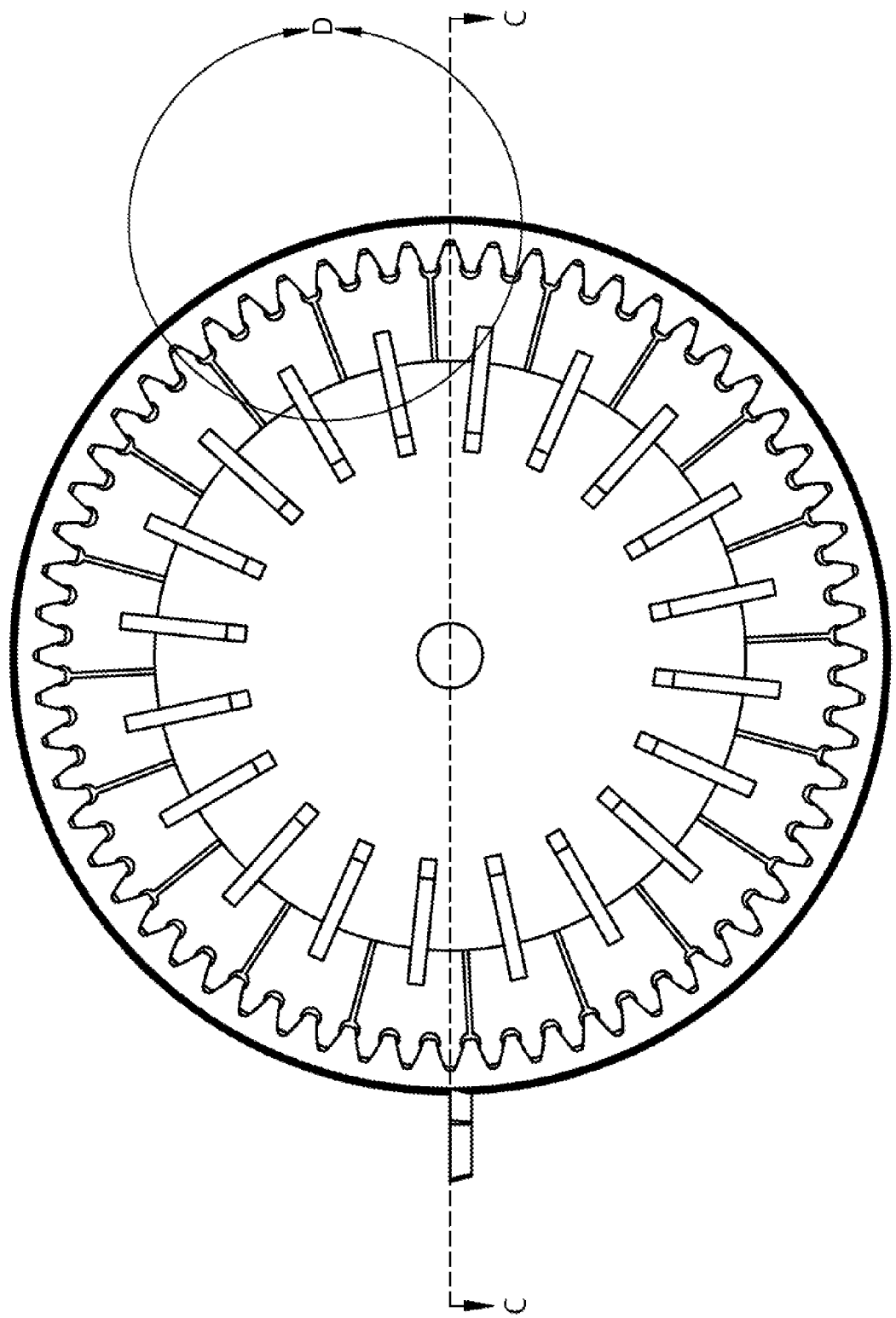
FIG. 14 shows a front elevation view of the mandrel and tube shown in FIG. 11.
Figure 15:
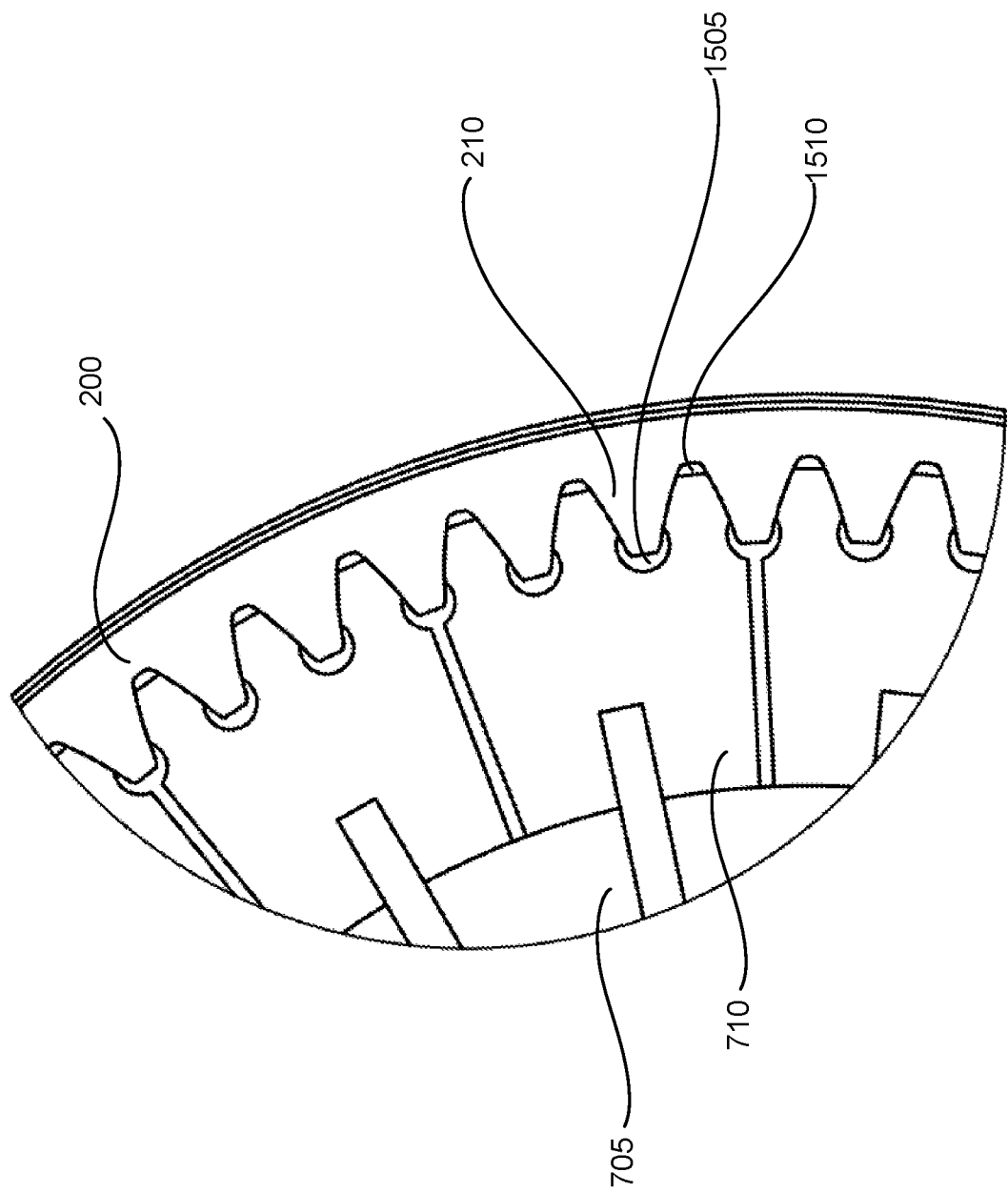
FIG. 15 shows a magnified view of portion D marked in FIG. 14.

FIG. 15 shows a magnified view of portion D marked in FIG. 14. FIG. 15 shows that when the mandrel is in its extended configuration, the tool teeth of toothed sections 710 abut against gear teeth 210 of tube 200. Tool teeth may be shaped to allow for gaps 1505 and 1510 when the tool teeth are abutting against the gear teeth. Gaps 1505 and 1510 prevent the force of the mandrel from being exerted or concentrated at the tips of gear teeth 210 or the tool teeth by preventing the tip of gear teeth 210 from contacting the valley between the tool teeth and the tip of the tool teeth from contacting the valley between gear teeth 210.

In this manner, gaps 1505 and 1510 allow the tool teeth and the gear teeth to abut along the sides of those teeth, and for the force of the mandrel to be exerted on the sides of the gear teeth. This force may cause a positional averaging whereby the positions of the ring gear teeth flanks are averaged in relation to the theoretical center of the ring gear. The extrusion process may impart a relatively accurate involute shape to each separate gear tooth. The action of mandrel, in turn, may help to ensure that the position from gear tooth to gear tooth is corrected and/or maintained. The shape and orientation of the gear teeth play a role in smooth, effective, and relatively quiet operation of the ring gear. As such, focusing the force and corrective action of the mandrel on the sides of the gear teeth allow for increasing the corrective action of the mandrel on the gear teeth, thereby increasing the performance of the ring gear.

Figure 16:
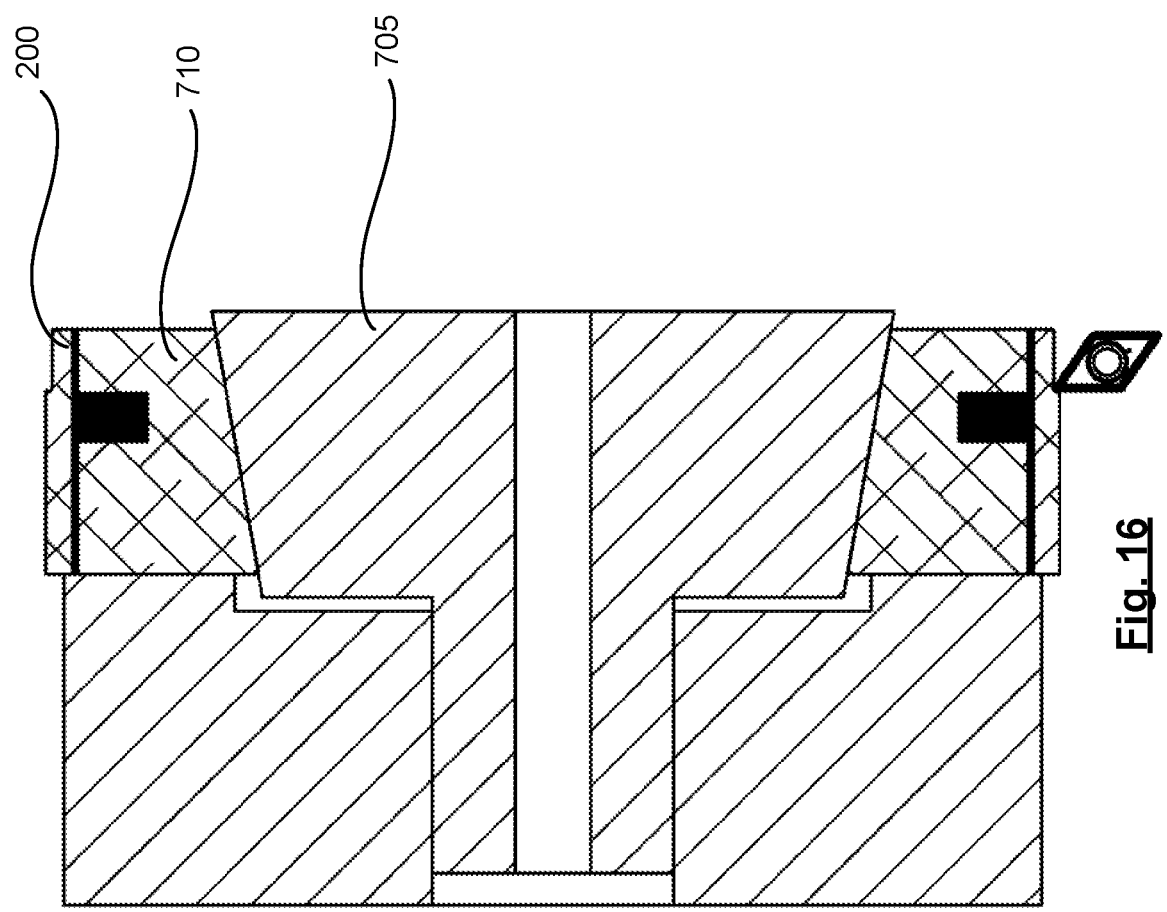
FIG. 16 shows a cross-sectional view of the mandrel and tube shown in FIG. 14, with the cross-section taken along line CC marked in FIG. 14.

While FIG. 15 shows gaps 1505 and 1510, it is contemplated that in some examples the mandrel and/or the ring gear may be designed such that one or more of gaps 1505 and 1510 may be absent. Turning now to FIG. 16, a cross-sectional view is shown of the mandrel and tube shown in FIG. 14. The cross-section is taken along line CC shown in FIG. 14.

Figure 17:
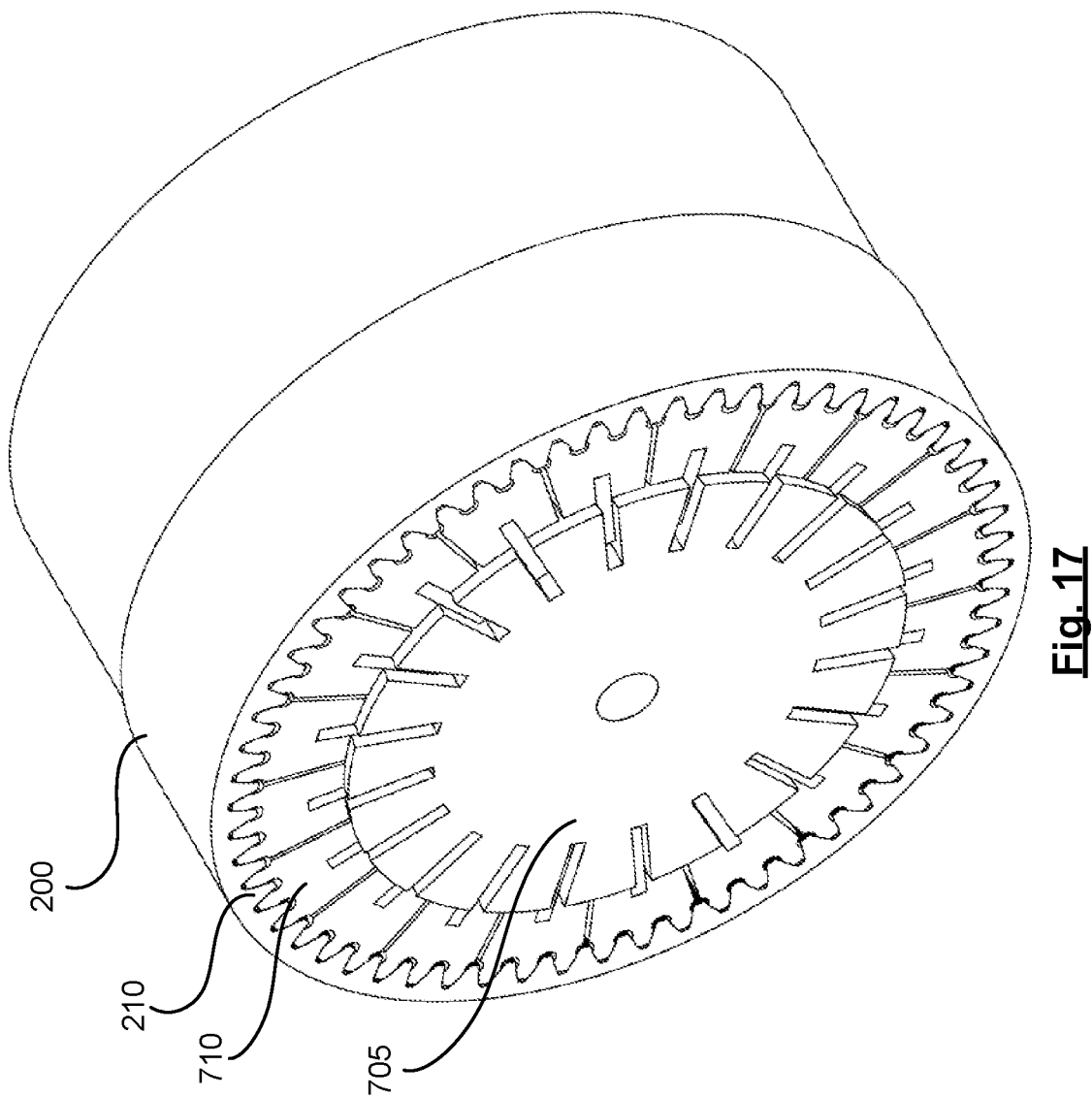
FIG. 17 shows a perspective view of the mandrel of FIG. 6 inserted into tube of FIG. 2.

FIG. 17 shows a perspective view of toothed sections 710 and core portion 705 of the mandrel inserted into tube 200. FIG. 17 shows the mandrel in its extended configuration with core portion 705 drawn in the axial direction relative to toothed sections 710. As the mandrel is in its extended configuration, the teeth of toothed sections 710 are abutting gear teeth 210 of tube 200. The outward radial force of the tool teeth of toothed sections 710 on gear teeth 210 of tube 200 may be used to force tube 200 into a circular or near-circular circumferential shape. The circumferential shape may also be described as the perimeter shape of tube 200. In some examples, the outward force may also be used to adjust the shape or orientation of gear teeth 210.

As discussed above, tube 200 may also be referred to as ring gear 200. Once the mandrel is inserted into ring gear 200 and forced into its extended configuration, the mandrel may in turn force ring gear 200 into a circular or near circular shape. Steps may then be taken to fix this circular shape of ring gear 200. In some examples, ring gear 200 may be machined on a lathe to adjust the outer perimeter to be circular or near-circular. In some examples, machining on the lathe may also be used to adjust the outer circular perimeter of ring gear 200 to be about concentric with the circle along which the gear teeth are arranged. It is also contemplated that in some examples, a method or machine other than a lathe may be used to fix the shape of the outer perimeter of ring gear 200.

Figure 18:
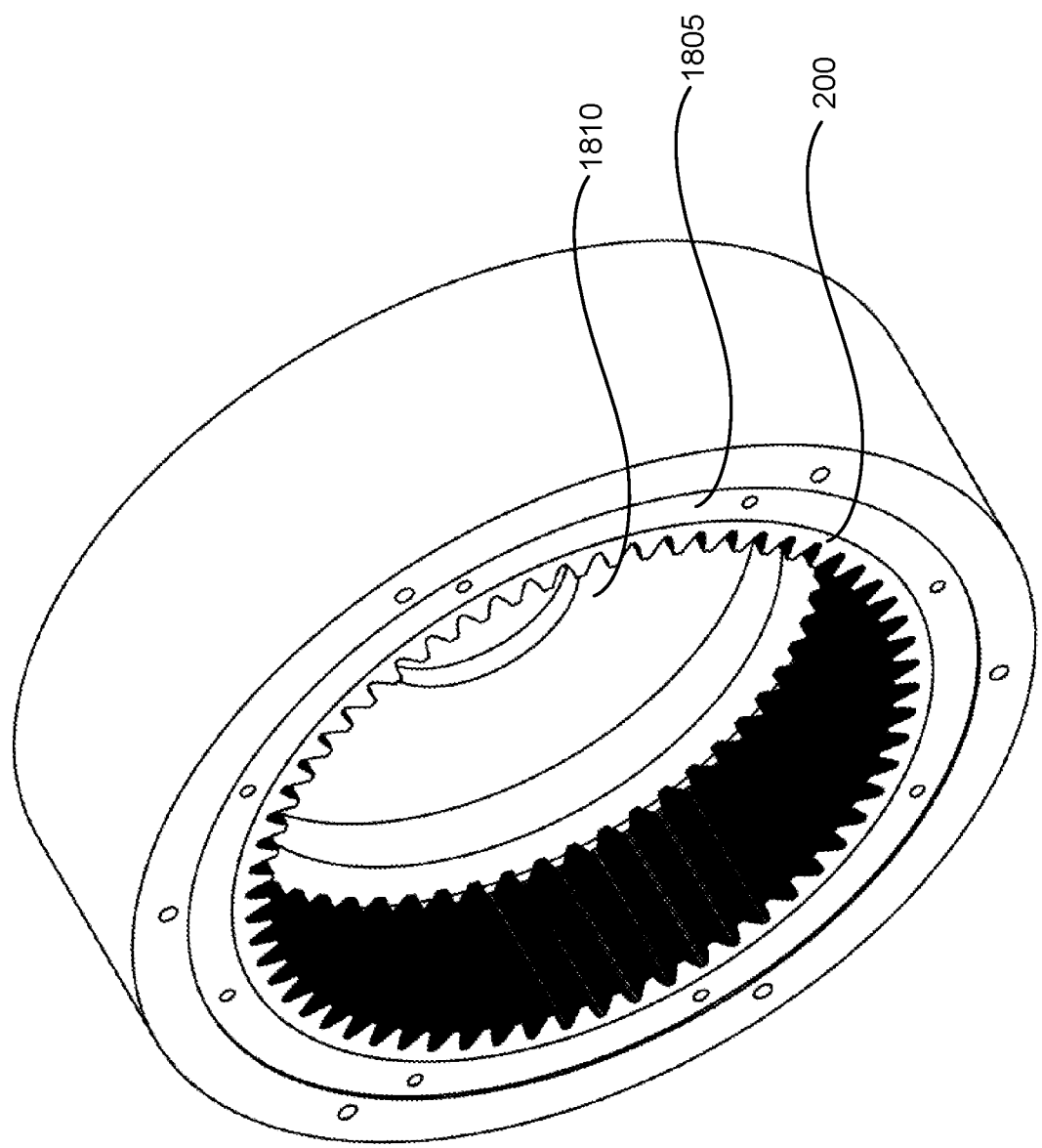
FIG. 18 shows a perspective view of the tube, i.e. ring gear, of FIG. 2 received into an example sleeve.

Moreover, in some examples the shape of the outer perimeter of ring gear 200 may be fixed or preserved by positioning a supporting member to abut the outer perimeter of ring gear 200 along at least a portion of the outer perimeter. In some examples, such a supporting member may comprise a sleeve, and positioning the supporting member to abut the outer perimeter may comprise inserting ring gear 200 into the sleeve to assist ring gear 200 to retain its shape. FIG. 18 shows a perspective view of ring gear 200 received into an example sleeve 1805. Sleeve 1805 may extend around the outer perimeter of ring gear 200. As shown in FIG. 18, sleeve 1805 may also comprise a partial end covering 1810. It is contemplated that in some examples sleeve 1805 need not comprise an end covering.

In some examples, sleeve 1805 may fit tightly or abuttingly around the outer perimeter of ring gear 200. As such, sleeve 1805 may support the circular shape of the outer perimeter of ring gear 200, and may prevent ring gear 200 from spontaneously collapsing or deforming into a non-circular shape. It is also contemplated that the support function of the sleeve need not be limited to preventing spontaneous deformations, and may also include preventing shape deformations caused by the application of external forces to the ring gear or by using the ring gear.

In some examples, sleeve 1805 may comprise a compression sleeve. For example, sleeve 1805 may be heated to expand, then ring gear 200 may be inserted into sleeve 1805, and then sleeve 1805 may be allowed to cool to contract and exert a compressive radial force on ring gear 200. A compression sleeve may provide an increased force on ring gear 200 to prevent ring gear 200 from spontaneously losing the circular shape of its outer perimeter.

In some examples, the mandrel may be inserted into the ring gear and be in its extended configuration when the ring gear is inserted into the sleeve. Then the mandrel may be retracted and removed. Moreover, in some examples the mandrel may be removed, and then the ring gear may be inserted into the sleeve. It is also contemplated that in some examples a support member or mechanism other than a sleeve may be used to support the ring gear to maintain its circular shape.

Figure 19:
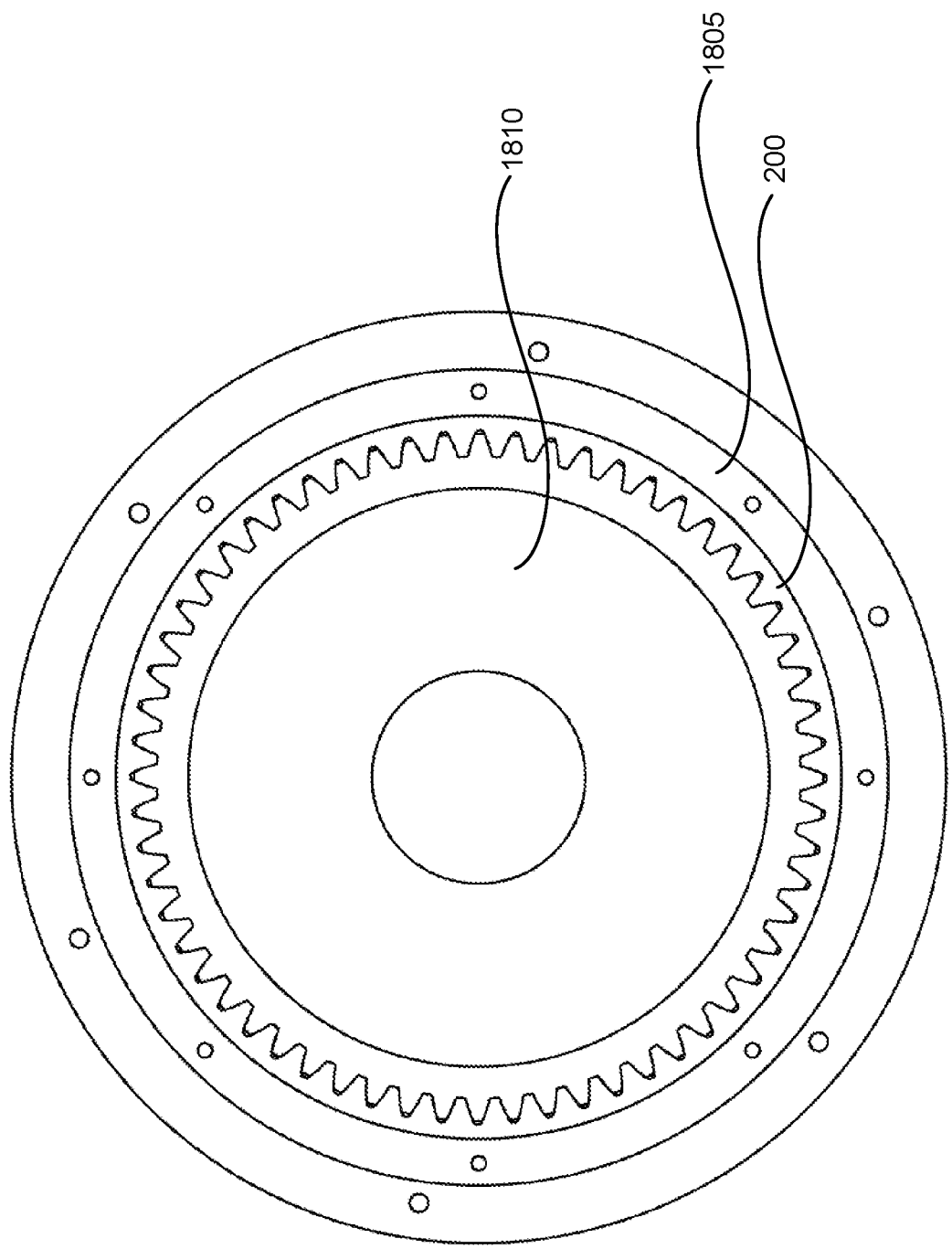
FIG. 19 shows a front elevation view of the ring gear of FIG. 2 and the sleeve of FIG. 18.
Figure 20:
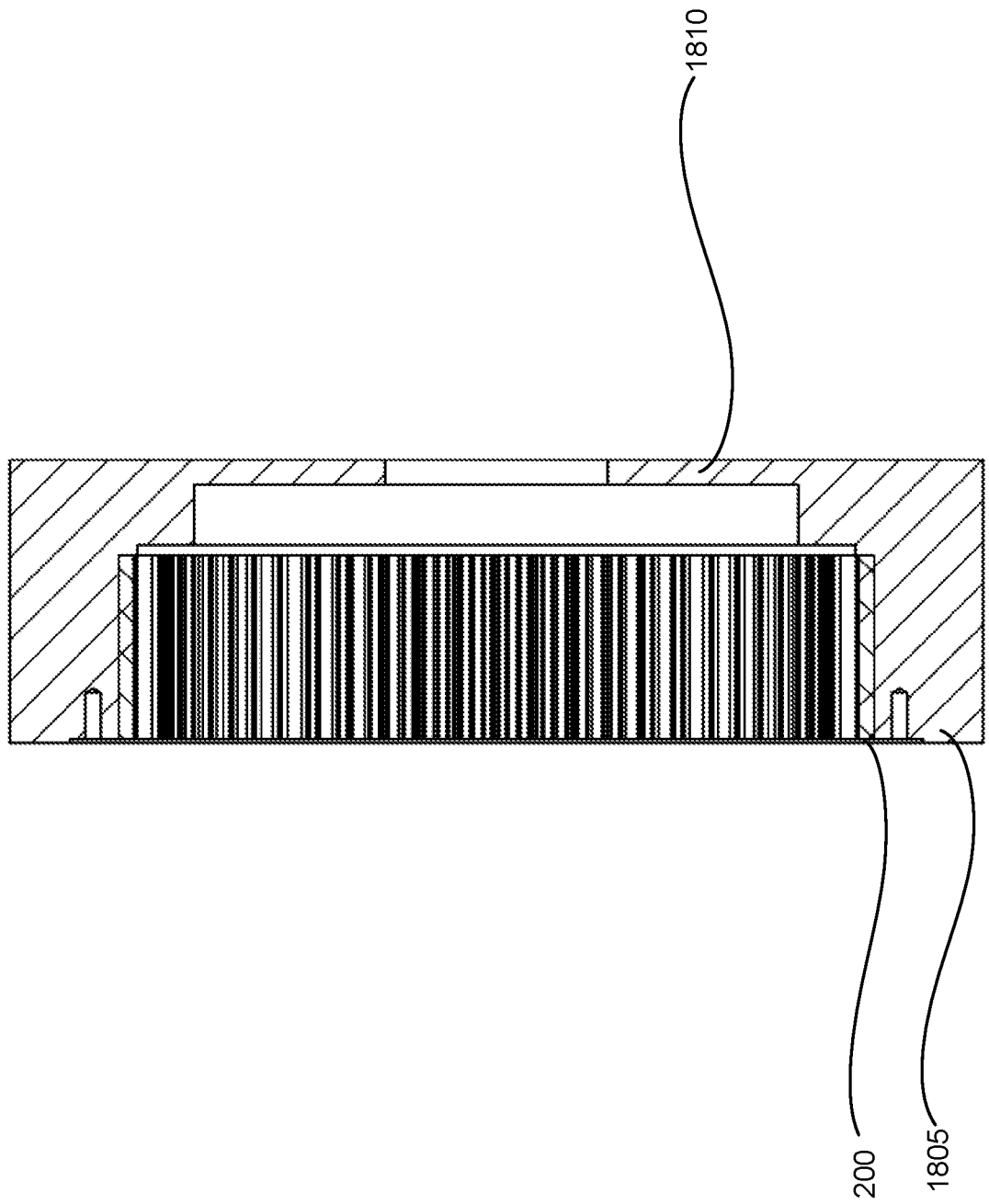
FIG. 20 shows an axial cross-sectional view of the ring gear of FIG. 2 received into the sleeve of FIG. 18.

Turning now to FIG. 19, a front elevation view is shown of ring gear 200 inserted into sleeve 1805. FIG. 20, in turn, shows a cross-sectional view of ring gear 200 received into sleeve 1805. In some examples, this sleeve may be stiffer than the ring gear. In addition, the sleeve's bore may be machined to a high degree of circularity so as to adjust or maintain the individual ring gear teeth (back) into the same relative position as they were while the correcting mandrel was inserted into the ring gear and the mandrel was in its extended configuration.

Figure 21:
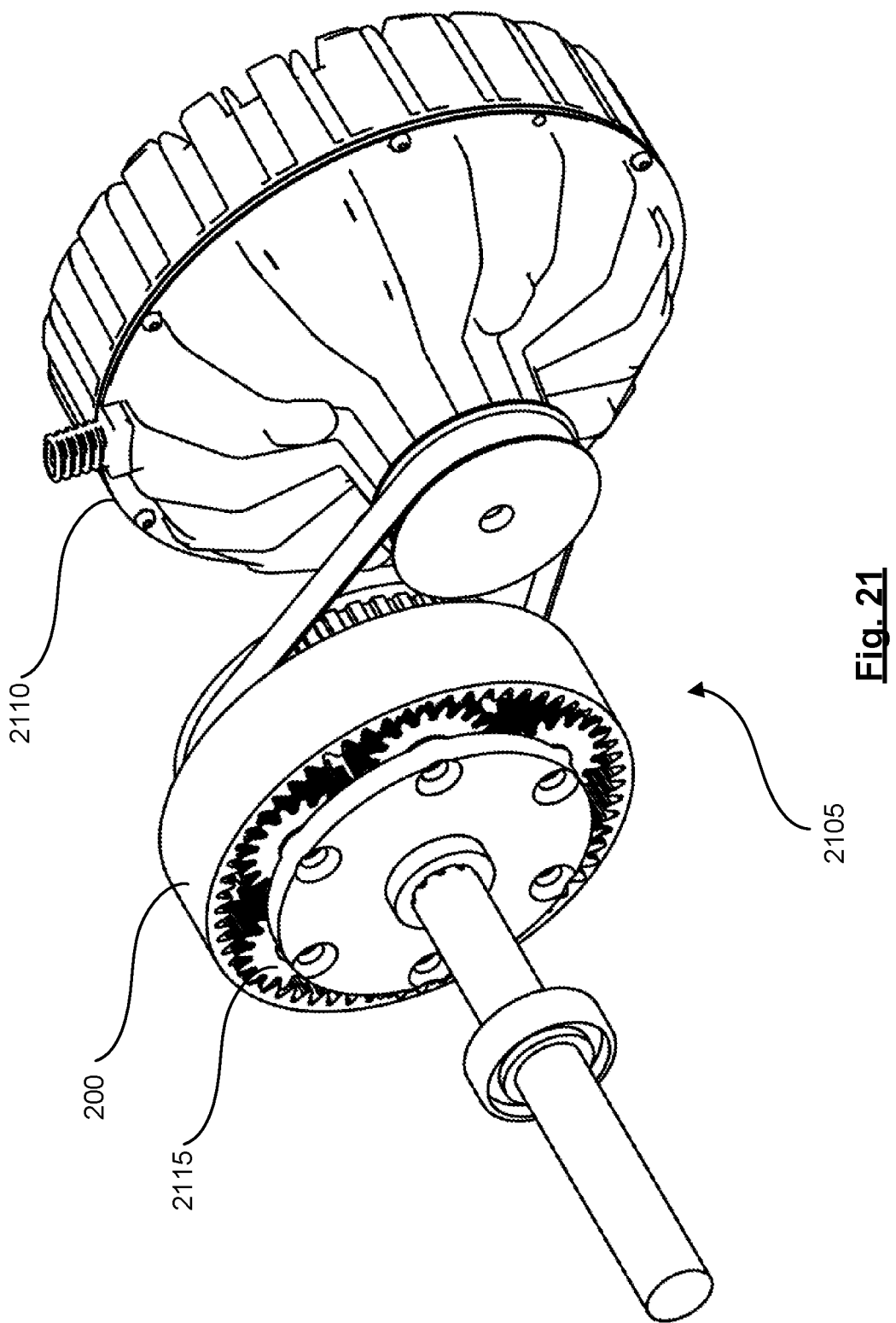
FIG. 21 shows a perspective view of an example planetary gear system coupled to an example motor.

Furthermore, FIG. 21 shows a perspective view of a planetary gear system 2105 coupled to a motor 2110. Ring gear 200, along with smaller planet gears 2115 may be used to make planetary gear system 2105. As shown in FIG. 21, planet gears 2115 may be matingly received inside ring gear 200 such that the gear teeth of each of the planet gears mates with the gear teeth of ring gear 200. Planetary gear system 2105 may be used as part of a transmission coupled to motor 2110. In some examples, motor 2110 may be an electric motor.

Planetary gear systems may be made using three planet gears received inside a ring year. Planetary gear system 2105 comprises six planet gears 2115 received inside ring gear 200. Using a relatively larger number of planet gears, e.g. six compared to three, reduces the force on each of the planet gears. This in turn allows the planet gears to be made of less expensive and/or softer materials. For example, planet gears 2115 may be made from plastics or polymers, using manufacturing techniques such as injection molding, and the like.

Extruding ring gear 200 and making planet gears 2115 from plastic may reduce the cost and time used to produce transmissions using planetary gear system 2105. The post-extrusion steps described herein may allow ring gear 200 to be a relatively precise and high-quality ring gear while also being manufactured as an extruded component. In addition, the use of six planet gears may allow for the use of plastic planet gears while maintaining good wear characteristics and operating quality. The manufacturing methods for ring gear 200 and/or the design of planetary gear system 2105 may provide for a relatively high quality transmission that may operate relatively quietly and for a relatively long operating life.

For example, the noise level of geared systems may be dependent on the accuracy of the involute shape of the teeth of the mating gears. Traditional methods of generating this profile in an internal gear such as a ring gear are expensive. Gear generated noise is more noticeable in an electric motor driven power train than in an internal combustion engine power train, at least partly because electric motors tend to operate more quietly than internal combustion engines. Moreover, the ring gears described herein may mesh with plastic planet gears with lower modulus of elasticity than aluminium to keep the contact stresses low enough to prevent damage to the aluminium ring gear.

The availability of high quality and low cost transmissions, in turn, may allow transmissions to be included in electric vehicle powertrains more frequently. The use of transmissions, in turn, may allow for a smaller variety of electric motors to be used to power a larger variety of vehicles with different power needs.

Figure 22:
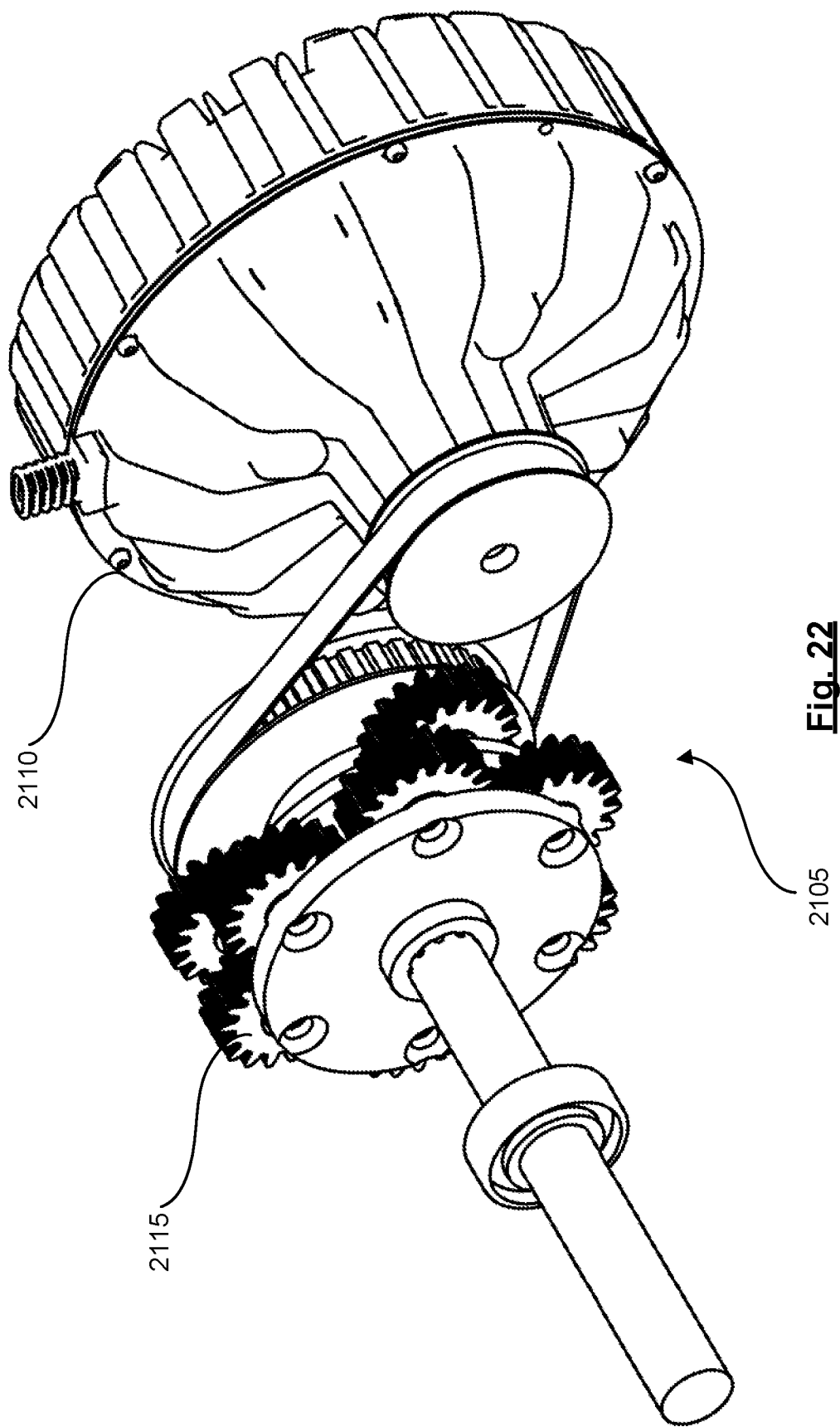
FIG. 22 shows another perspective view of the motor and planetary gear system of FIG. 21.
Figure 23:
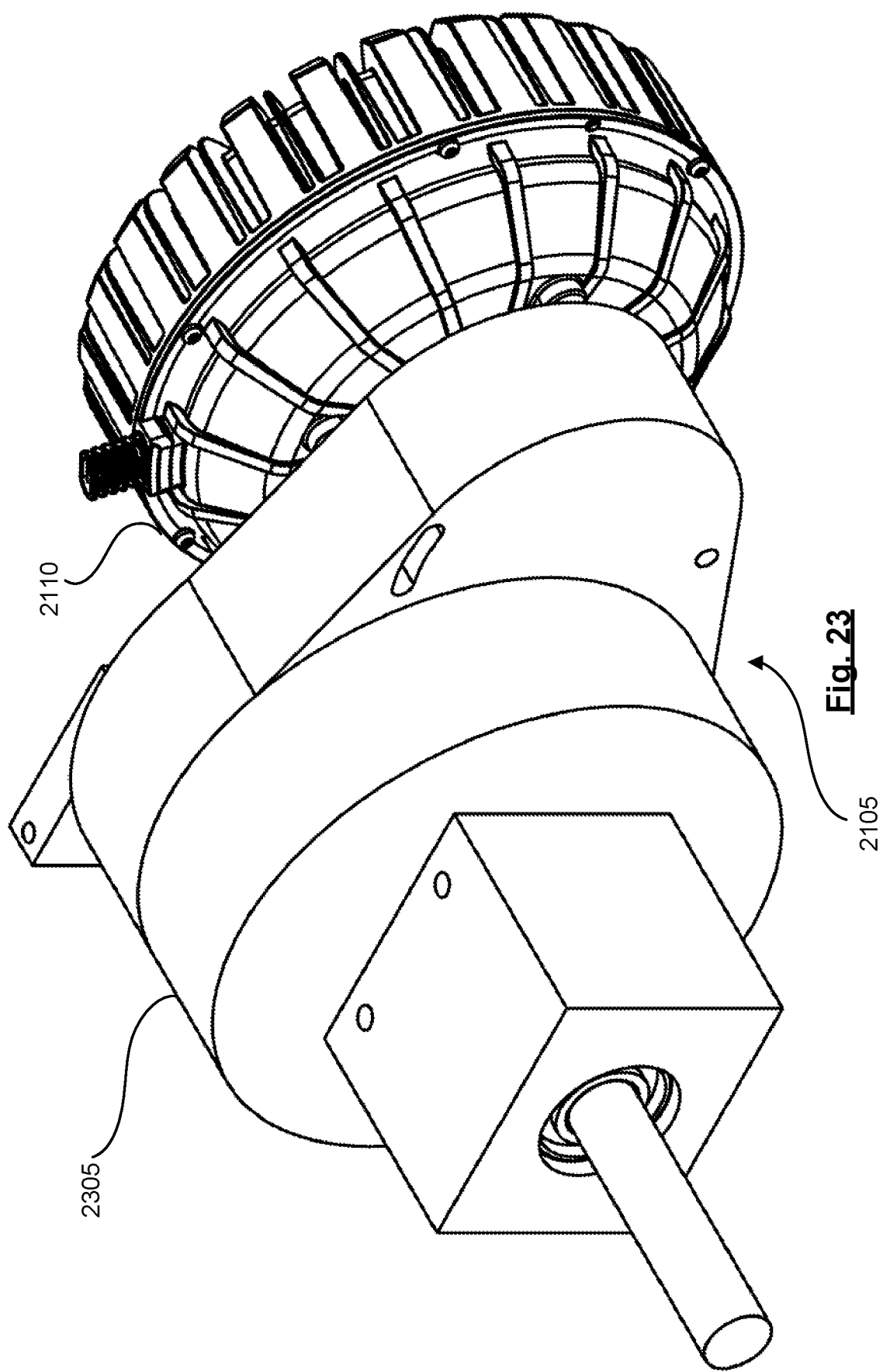
FIG. 23 shows another perspective view of the motor and planetary gear system of FIG. 21, where an example housing covers the planetary gear system.
Figure 24:
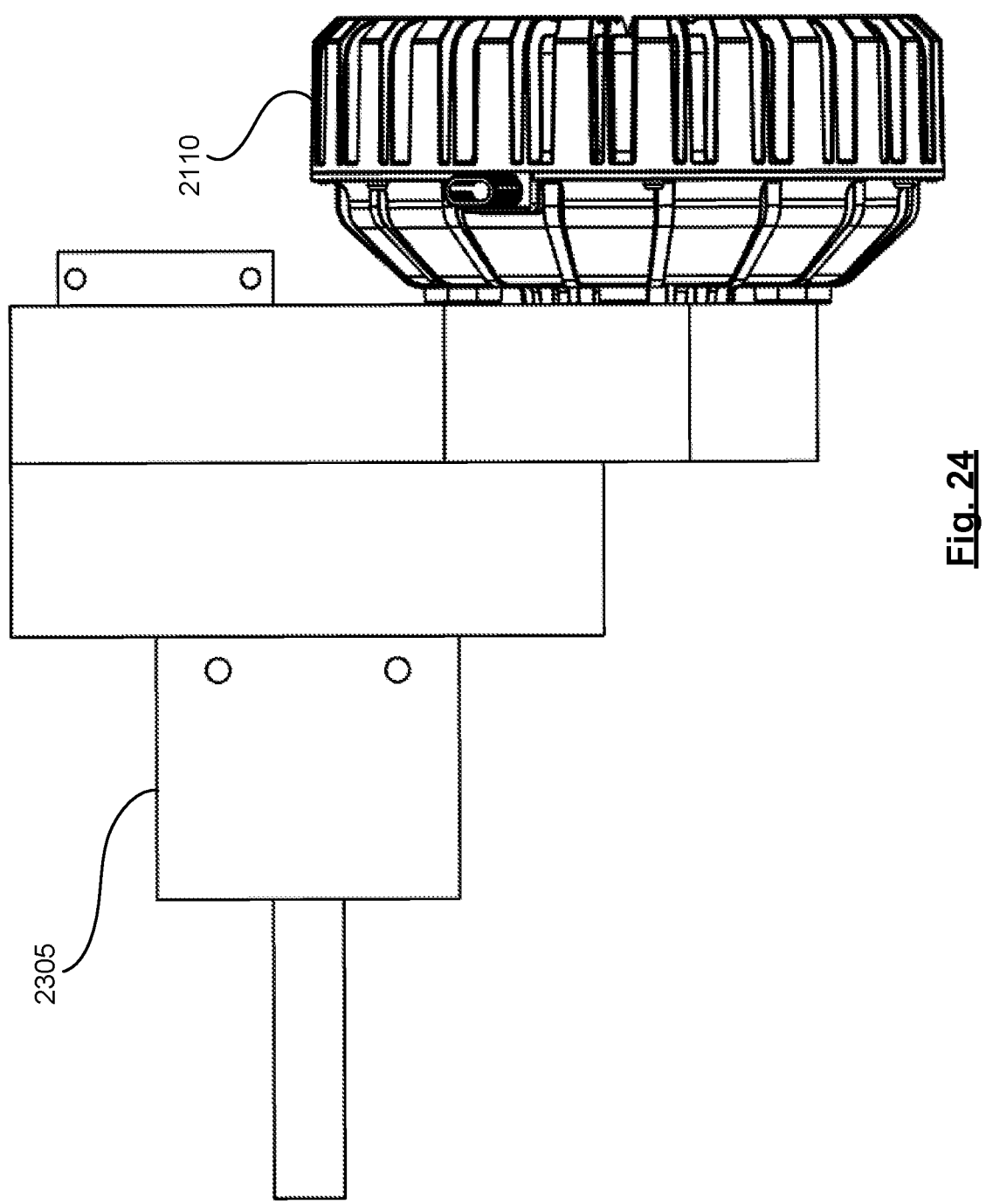
FIG. 24 shows a plan view of the motor and housing of FIG. 23.
Figure 25:
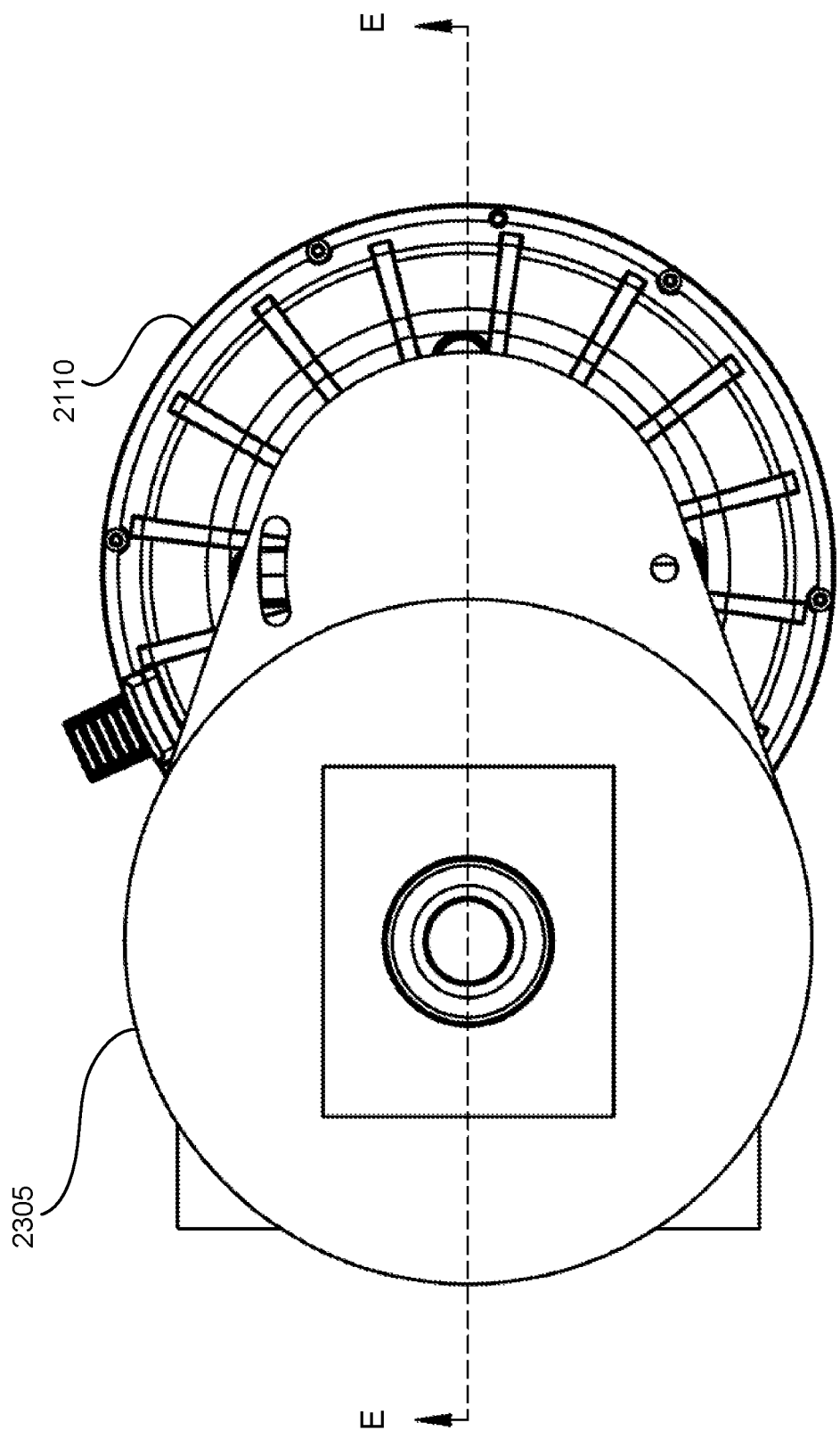
FIG. 25 shows a side elevation view of the motor and housing of FIG. 23.
Figure 26:
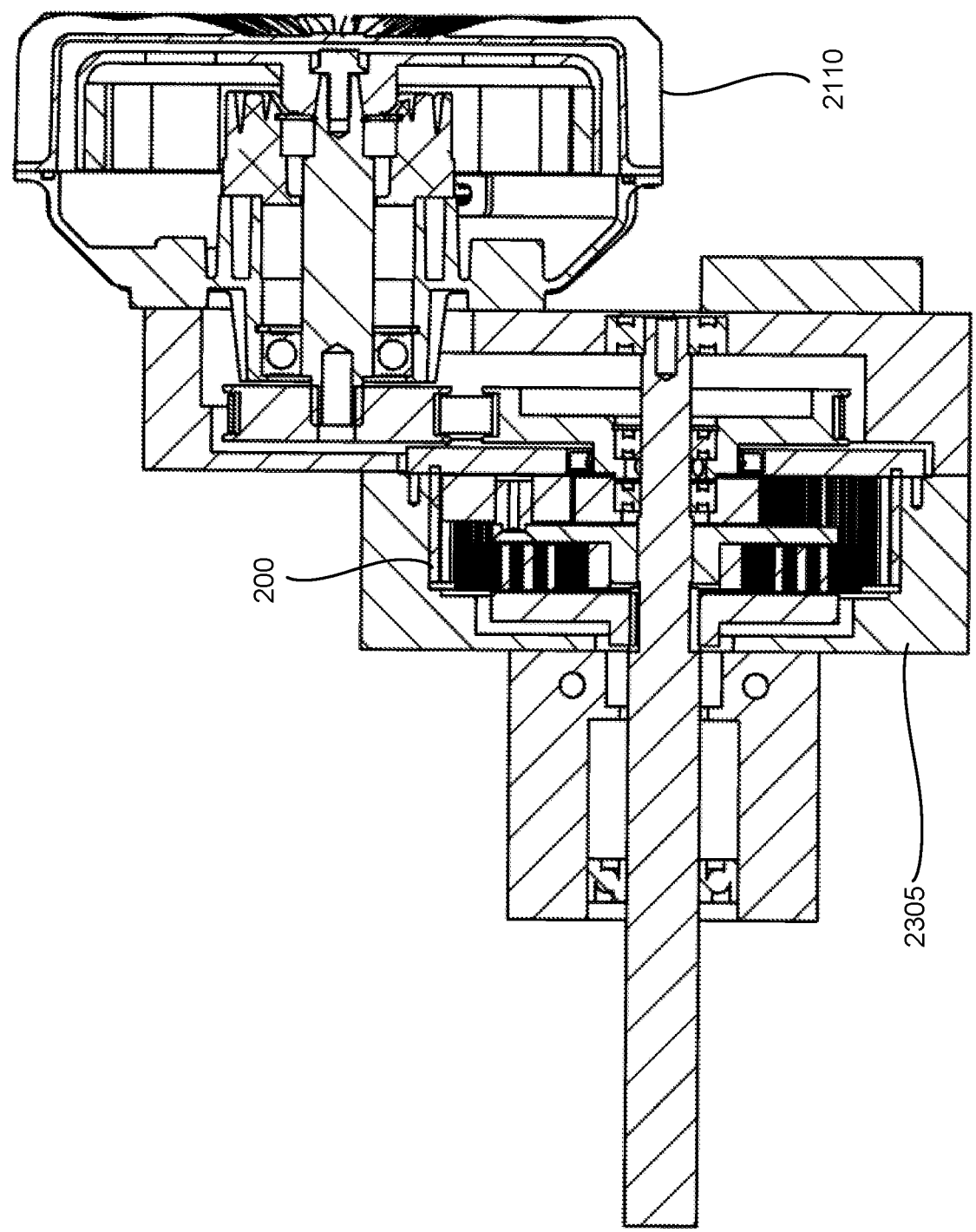
FIG. 26 shows a cross-sectional view of the motor and housing of FIG. 23, with the cross-section taken along line EE marked in FIG. 25.

FIG. 22 shows another perspective view of motor 2110 and planetary gear system 2105, with ring gear 200 removed to better show planet gears 2115. FIG. 23 shows another perspective view of motor 2110 where a housing 2305 covers planetary gear system 2105. FIG. 24, in turn, shows a plan view of motor 2110 and housing 2305. Moreover, FIG. 25 shows a side elevation view of motor 2110 and housing 2305. Furthermore, FIG. 26 shows a cross-sectional view of motor 2110 and housing 2305, which houses the transmission. The cross-section is taken along line EE marked in FIG. 25. A cross-section of ring gear 200 is visible in FIG. 26.

The above description describes examples of the present invention, and alterations and modifications may be made thereto, by those of skill in the art, without departing from the scope of the invention which is defined solely by the claims appended hereto.

The invention claimed is:

1. A method of forming a ring gear, the method comprising:
   providing a tube having an inner surface comprising gear teeth, the tube being a hollow tube formed by extrusion, the gear teeth oriented axially along the tube, and the gear teeth oriented non-circumferentially relative to the tube;
   inserting a shaping tool into the tube, the shaping tool having tool teeth to mate with the gear teeth, the shaping tool having an extended configuration and a retracted configuration, the shaping tool inserted into the tube in its retracted configuration;
   extending the shaping tool into its extended configuration to cause the tool teeth to mate with the gear teeth and to exert a radially outward force on the tube;
   fixing a shape of an outer perimeter of the tube;
   retracting the shaping tool into its retracted configuration to reduce the radially outward force exerted by the shaping tool on the tube; and
   removing the shaping tool from the tube.

2. The method of claim 1, wherein the providing the tube comprises extruding the tube.

3. The method of claim 1, wherein the providing the tube comprises providing a hollow metallic tube.

4. The method of claim 3, wherein the providing the tube comprises providing an aluminum tube.

5. The method of claim 4, further comprising anodizing the gear teeth.

6. The method of claim 1, further comprising sectioning the tube to form one or more rings.

7. The method of claim 1, wherein:
   the shaping tool comprises a mandrel having:
      a plurality of toothed sections arranged radially around a core portion, each of the toothed sections comprising a subset of the tool teeth, each of the toothed sections movably abutting the core portion along an inclined surface inclined relative to an axial axis of the mandrel, wherein:
         moving the core portion in a first direction along the axial axis relative to the toothed sections moves the toothed sections radially away from the core portion to extend the shaping tool into its extended configuration; and
         moving the core portion in a second direction along the axial axis relative to the toothed sections moves the toothed sections radially towards the core portion to retract the shaping tool into its retracted configuration, the second direction opposite the first direction; and
      the extending the shaping tool comprises moving the core portion in the first direction relative to the toothed sections.

8. The method of claim 7, wherein the retracting the shaping tool comprises moving the core portion in the second direction relative to the toothed sections.

9. The method of claim 1, wherein the fixing the shape comprises machining the outer perimeter to adjust the shape of the outer perimeter relative to the gear teeth.

10. The method of claim 1, wherein the fixing the shape comprises positioning a supporting member to abut the outer perimeter along at least a portion of the outer perimeter.

11. The method of claim 10, wherein:
    the supporting member comprises a sleeve; and
    the positioning the supporting member to abut the outer perimeter along at least the portion of the outer perimeter comprises inserting the tube into the sleeve.

12. The method of claim 1, further comprising refining a shape of the gear teeth, wherein the refining the shape of the gear teeth comprises one or more of:
    the extending the shaping tool into its extended configuration to cause the tool teeth to mate with the gear teeth and to exert the radially outward force on the tube; and
    shaping the gear teeth using a further shaping tool.

13. A method of forming a ring gear, the method comprising:
    providing a tube having an inner surface comprising gear teeth, the tube being a hollow tube formed by extrusion;
    inserting a shaping tool into the tube, the shaping tool having tool teeth to mate with the gear teeth, the shaping tool having an extended configuration and a retracted configuration, the shaping tool inserted into the tube in its retracted configuration;
    extending the shaping tool into its extended configuration to cause the tool teeth to mate with the gear teeth and to exert a radially outward force on the tube;
    fixing a shape of an outer perimeter of the tube;
    retracting the shaping tool into its retracted configuration to reduce the radially outward force exerted by the shaping tool on the tube; and
    removing the shaping tool from the tube;
    wherein:
       the shaping tool comprises a mandrel having:
          a plurality of toothed sections arranged radially around a core portion, each of the toothed sections comprising a subset of the tool teeth, each of the toothed sections movably abutting the core portion along an inclined surface inclined relative to an axial axis of the mandrel, wherein:
  moving the core portion in a first direction along the axial axis relative to the toothed sections moves the toothed sections radially away from the core portion to extend the shaping tool into its extended configuration; and
  moving the core portion in a second direction along the axial axis relative to the toothed sections moves the toothed sections radially towards the core portion to retract the shaping tool into its retracted configuration, the second direction opposite the first direction; and
the extending the shaping tool comprises moving the core portion in the first direction relative to the toothed sections.

\* \* \* \* \*